(12) United States Patent
Middleton, Jr.

(10) Patent No.: US 9,375,016 B2
(45) Date of Patent: Jun. 28, 2016

(54) CONVECTION HEATING IN TRACK OVENS

(71) Applicant: Stewart Systems Baking, LLC, Plano, TX (US)

(72) Inventor: Robert Wesley Middleton, Jr., Caddo Mills, TX (US)

(73) Assignee: Stewart Systems Baking, LLC, Plano, TX (US)

( * ) Notice: Subject to any disclaimer, the term of this patent is extended or adjusted under 35 U.S.C. 154(b) by 0 days.

(21) Appl. No.: 13/955,939

(22) Filed: Jul. 31, 2013

(65) Prior Publication Data

US 2014/0037809 A1 Feb. 6, 2014

Related U.S. Application Data

(60) Provisional application No. 61/677,758, filed on Jul. 31, 2012.

(51) Int. Cl.
| | |
|---|---|
| A23B 4/03 | (2006.01) |
| A21B 1/44 | (2006.01) |
| A21B 1/24 | (2006.01) |
| A21B 1/48 | (2006.01) |

(52) U.S. Cl.
CPC ... *A21B 1/44* (2013.01); *A21B 1/24* (2013.01); *A21B 1/48* (2013.01)

(58) Field of Classification Search
CPC .......................................... A21B 1/44
USPC ............ 99/474, 479, 443 C, 443 R, 447, 335, 99/246, 365, 478; 432/72, 126, 222, 133, 432/176, 199; 126/21 A, 21 R
See application file for complete search history.

(56) References Cited

U.S. PATENT DOCUMENTS

| | | | | |
|---|---|---|---|---|
| 4,726,766 | A | * | 2/1988 | Stewart et al. ................. 432/133 |
| 5,010,808 | A | * | 4/1991 | Lanham ....................... 99/443 C |
| 6,138,660 | A | * | 10/2000 | Middleton, Jr. ............... 126/21 A |

* cited by examiner

*Primary Examiner* — Phuong Nguyen
(74) *Attorney, Agent, or Firm* — Klemchuk LLP; Kirby B. Drake

(57) ABSTRACT

In various implementations, track ovens may include spiral conveyor systems, burners, and/or fans for heating. The fans may transfer heated air from a first portion of the oven and deliver the heated air to a second portion of the oven through a ducting system. The ducting system may deliver the air proximate a top surface and a bottom surface of a bakery product. The ducting system may allow variable control of the hot air delivery.

10 Claims, 30 Drawing Sheets

CONVECTION HEATING IN TRACK OVENS

CROSS-REFERENCE TO RELATED APPLICATION

This application claims priority to U.S. Provisional Patent Application No. 61/677,758, entitled "Convection Heating in Track Ovens," filed on Jul. 31, 2012, which is hereby incorporated by reference for all purposes.

TECHNICAL FIELD

The present invention relates to convection heating, and more particularly to convection heating in track ovens.

BACKGROUND

Automated bakeries may use track ovens to bake bread, buns, rolls, and other bakery products. In a track oven, a track extends through a bakery enclosure, and a drive chain extends through the track and supports conveyor grids. The conveyor grids may include a plurality of grids separated by a space. The grids receive and transport bakery pans.

During operation, dough, for example, is disposed on trays or pans, which are disposed onto the grids of the track oven. The grids and the dough-laden trays are transported through the oven. The oven may be heated by ribbon burners. The length of the track conveyor and the speed of operation may be controlled so that dough products are baked to a degree of doneness when the dough products exit the oven.

SUMMARY

In various implementations, an oven may include a spiral track, heater(s), and a air transporter. The heaters may generate heat in the oven and at least partially cook bakery products in the oven. The heaters may heat at least a portion of the air disposed in the oven and/or proximate a heater. The air transporter may include upper fan(s) to deliver at least a portion of the heated air to an upper surface of a bakery product and/or an upper surface of a container on at least a portion of the track. The air transporter may include lower fan(s) to deliver at least a portion of the heated air to a lower surface of a bakery product and/or container on at least a portion of the track. The heated air may be delivered by the fan(s) through branches disposed above and/or below portions of the track.

In various implementations, upper fan(s) and/or lower fan(s) may be allowed to operate such that heated air is delivered to upper surfaces and/or lower surfaces of bakery products and/or containers. The amount of heated air delivered may be controllable. In some implementations, the amount of heated air delivered may be controlled based on a type of bakery product, a type of other bakery products in the oven, and/or properties of the bakery product during use.

In various implementations, an oven may include a spiral track, one or more burners, and/or an air transporter. The spiral track may transport containers through the oven. Burner(s) may provide heat. The air transporter may include at least two fans and ducting. The fan(s) may generate an air flow. The ducting may be coupled to one or more of the fans. The ducting may include a top line and a bottom line. The top line may include a plurality of openings. The top line may be configured such that at least a portion of the air flow from at least one of the fans travels through the ducting and may be directed through the openings in the top line to an area proximate a top of a first segment of the track. The bottom line may include a plurality of openings. The bottom line may be configured such that at least a portion of the air flow from at least one of the fans travels through the ducting and may be directed through the openings in the bottom line to an area proximate a bottom of a second segment of the track.

Implementations may include one or more of the following features. The first segment of the track and the second segment of the track may be disposed in the same portion of the oven. The first segment of the track may be disposed proximate the second segment of the track. The first segment of the track may include at least a portion of the second segment of the track. At least one of the fans may be independently operable from at least one of the other fans. The top line may include one or more stems. A stem may include a plurality of branches. A branch may include a plurality of openings disposed about a length of a branch. In some implementations, a first branch may include a plurality of openings disposed along a length of the first branch in a first arrangement, and a second branch may include a plurality of openings disposed along a length of the second branch in a second arrangement. The first arrangement of openings may include openings approximately linearly disposed along a length of the first stem. The first arrangement and the second arrangement may be similar or dissimilar. In some implementations, stop(s) may be disposed in at least one of the openings of the top line and/or at least one of the openings of the bottom line. A stop may restrict flow through an opening. The spiral track may include a plurality of segments. The segments may include one or more straight segments coupled by one or more curved segments. A straight segment of the track may include at least one linear portion. A curved segment of the track may include at least one curved portion. At least one of the burners may be disposed proximate one of the straight segments of the track. The ducting may be configured to direct air proximate the one or more burners, which are proximate at least one of the straight segments, to an area of the oven, which is proximate at least one curved segment of the track. In some implementations, and at least two of the fans may be disposed proximate at least one of the straight segments of the track. Fans may include a first fan coupled to a first surface of the oven and a second fan coupled to an opposing surface of the oven. Fans may include a first fan and a second fan coupled to a surface of the oven.

In various implementations, air may be allowed to flow from openings disposed along a length of a first branch of a ducting of an oven to an area proximate a top surface of a segment of a track. Air may be allowed to flow from openings disposed along a length of a second branch of the ducting of an oven to an area proximate a bottom surface of the segment of track.

Implementations may include one or more of the following features. An amount of air delivered from a first branch may not be the same as an amount of air delivered from the second branch. In some implementations, a temperature of at least a part of the air in the oven may be elevated using at least one burner, and at least portion of the elevated temperature air may be delivered from a first portion of the oven to a second portion of the oven through the ducting. Air flow through one or more of the openings in the first branch and/or one or more openings in the second branch may be restricted.

In various implementations, at least one top fan of an oven may be operated at a first control setting, and air may be allowed to flow from at least one of the top fans to an area proximate a top of a first segment of a track of the oven based at least partially on the first control setting. At least one bottom fan may be operated at a second control setting. Air may be allowed to flow from at least one of the bottom fans to an area proximate a bottom of a second segment of the track of the oven based at least partially on the second control setting. In some implementations, the first control setting and the second control setting may be similar or dissimilar.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

In various implementations, bakery products, such as bread, buns, and rolls, may be baked in a track oven. Bakery product(s) (e.g., dough and/or batter for bakery products) may be disposed in a container that is disposed on a portion of a track of the oven. For example, bread dough may be positioned in a baking container and the baking container may be positioned on a grid that is coupled to a drive chain. The dough may be at least partially cooked during the time spent in the oven (e.g., a residence time).

The track oven may include heaters, such as natural gas and/or electric burners 101 that provide heat to an oven. The track oven may also include an air transporter to transfer heated air from a portion of the oven to another portion of the oven. The air transporter may include fans and ducting. The ducting may provide heated air proximate a top surface and a bottom surface of a bakery product in at least a portion of the oven. The air transporter may allow variable control of the heated air provided to a portion of the oven. The air transporter may decrease baking times, improving coloring of bakery products, reduce costs (e.g., since hot air generated as a byproduct of the heaters is utilized in various portions of the oven) and/or promote even baking.

Figure 1:
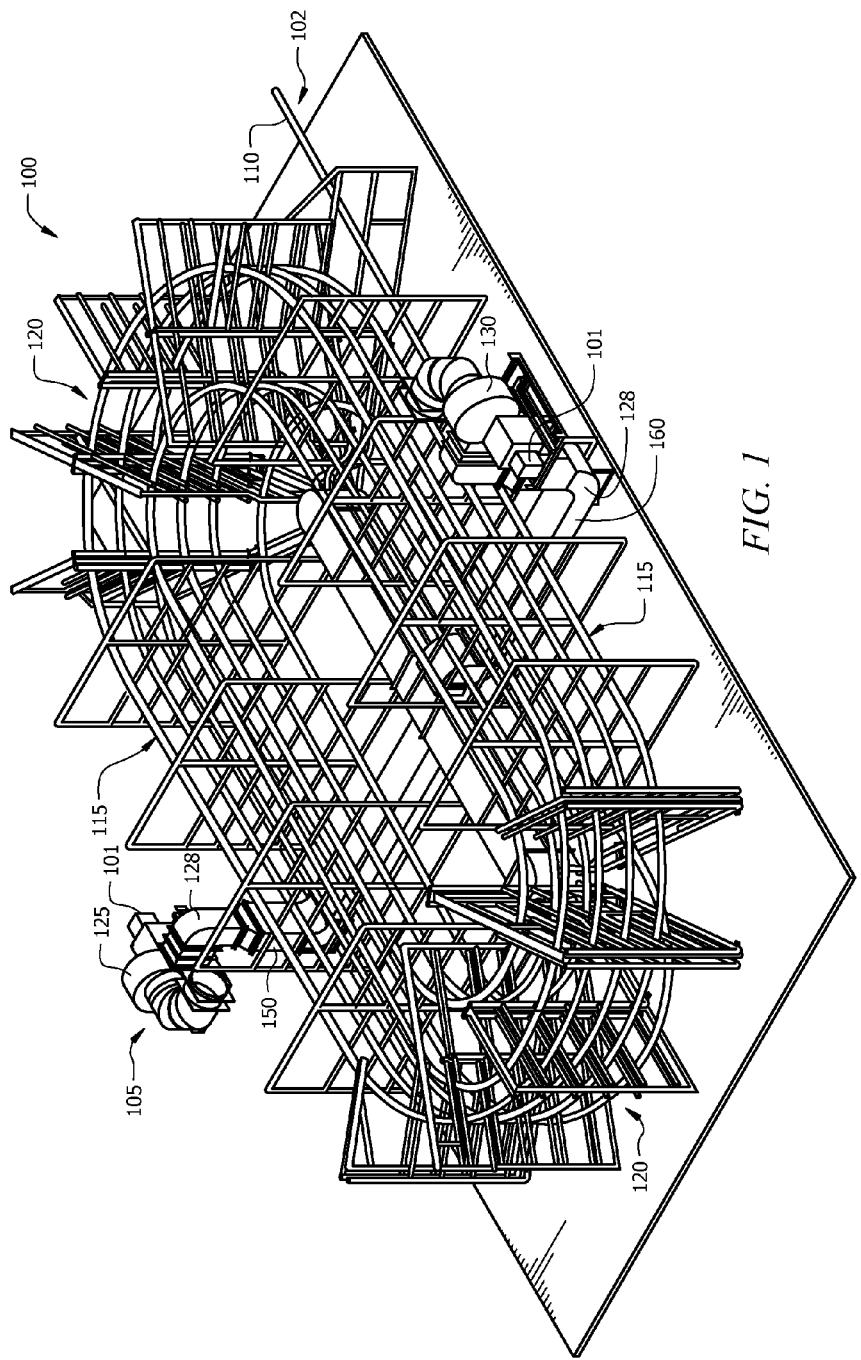
FIG. 1 illustrates a cut away view of an implementation of an example track oven.
Figure 2:
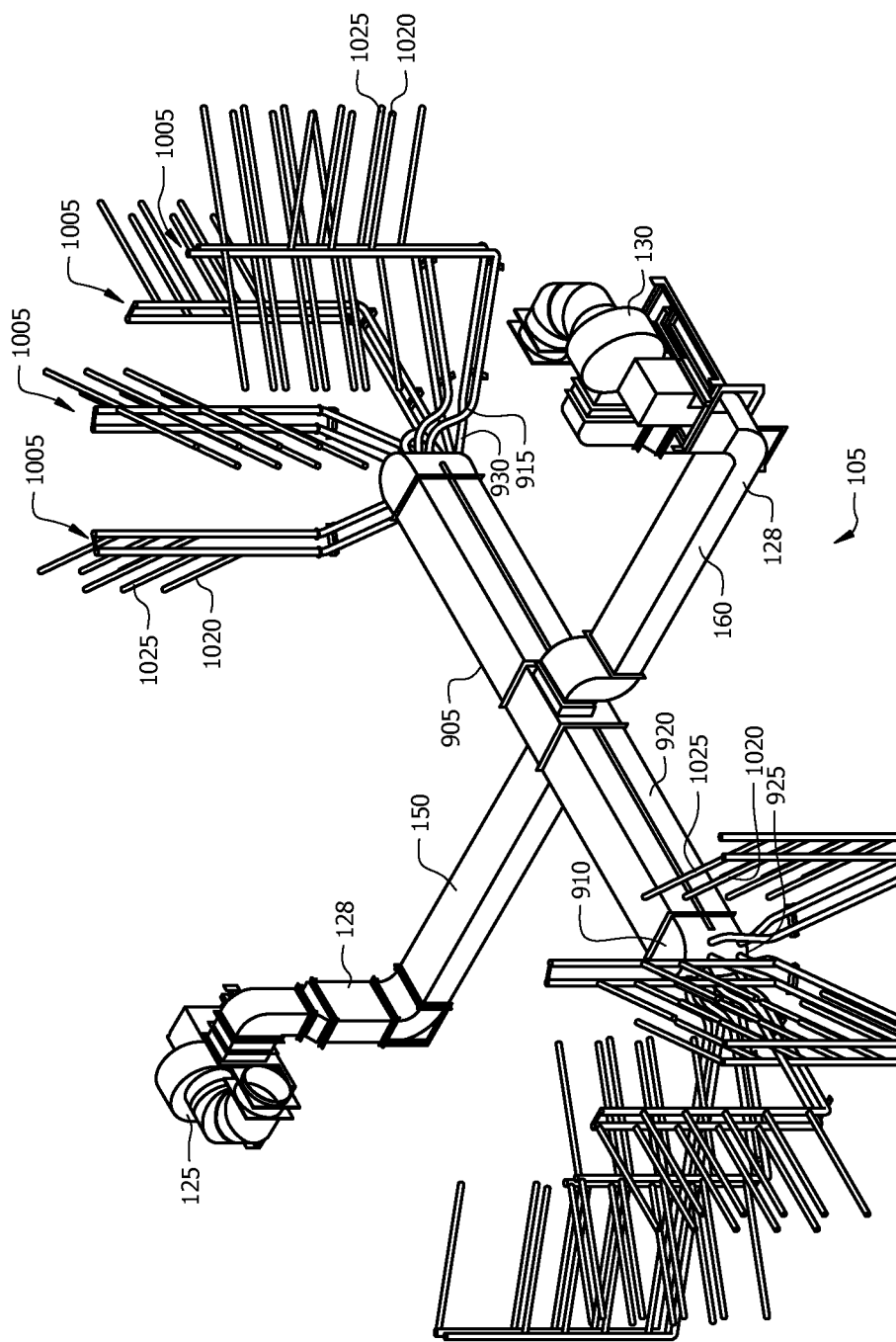
FIG. 2 illustrates an implementation of an example air transporter.
Figure 3:
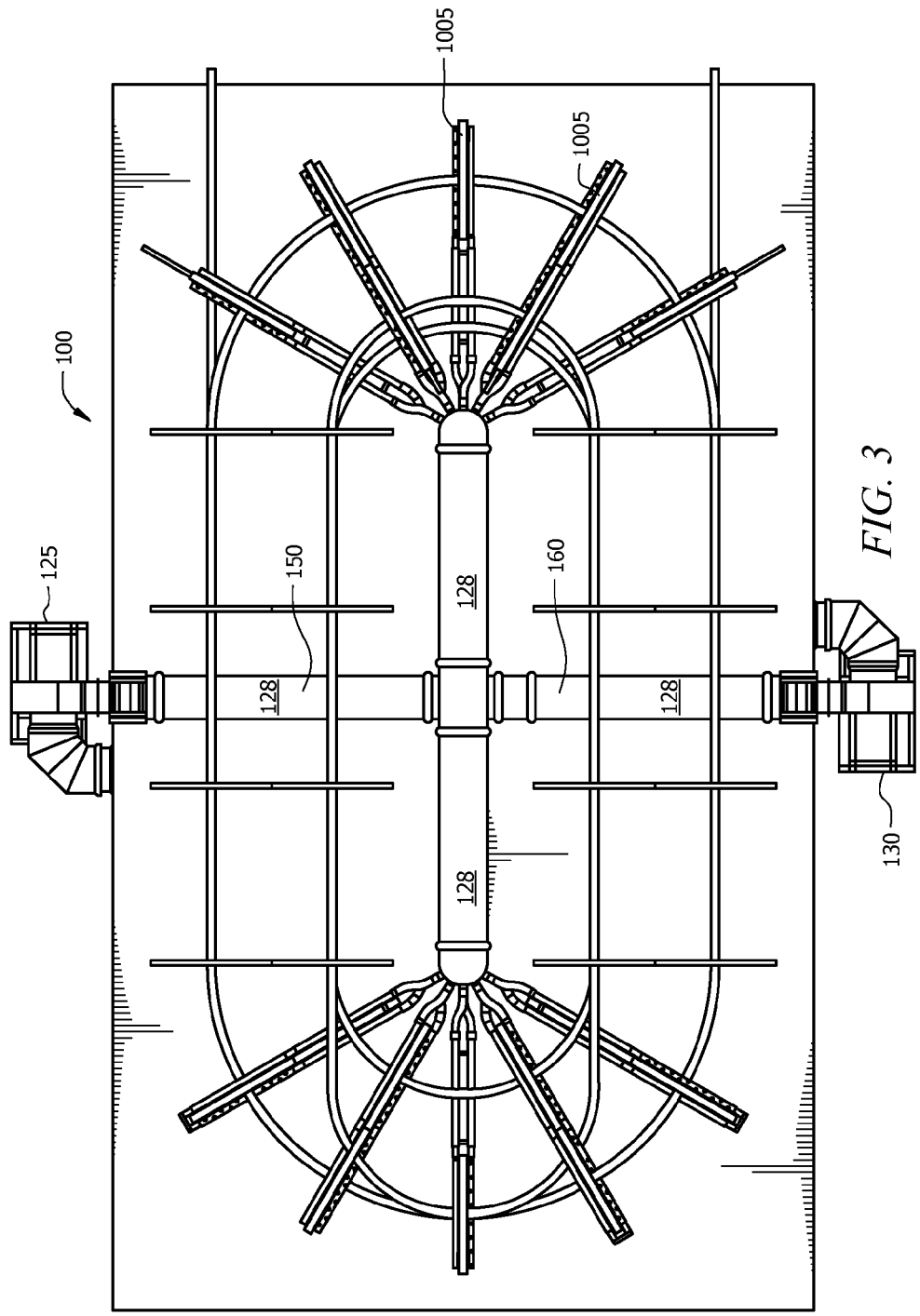
FIG. 3 illustrates a top view of a cut away of an implementation of an example track oven.
Figure 4:
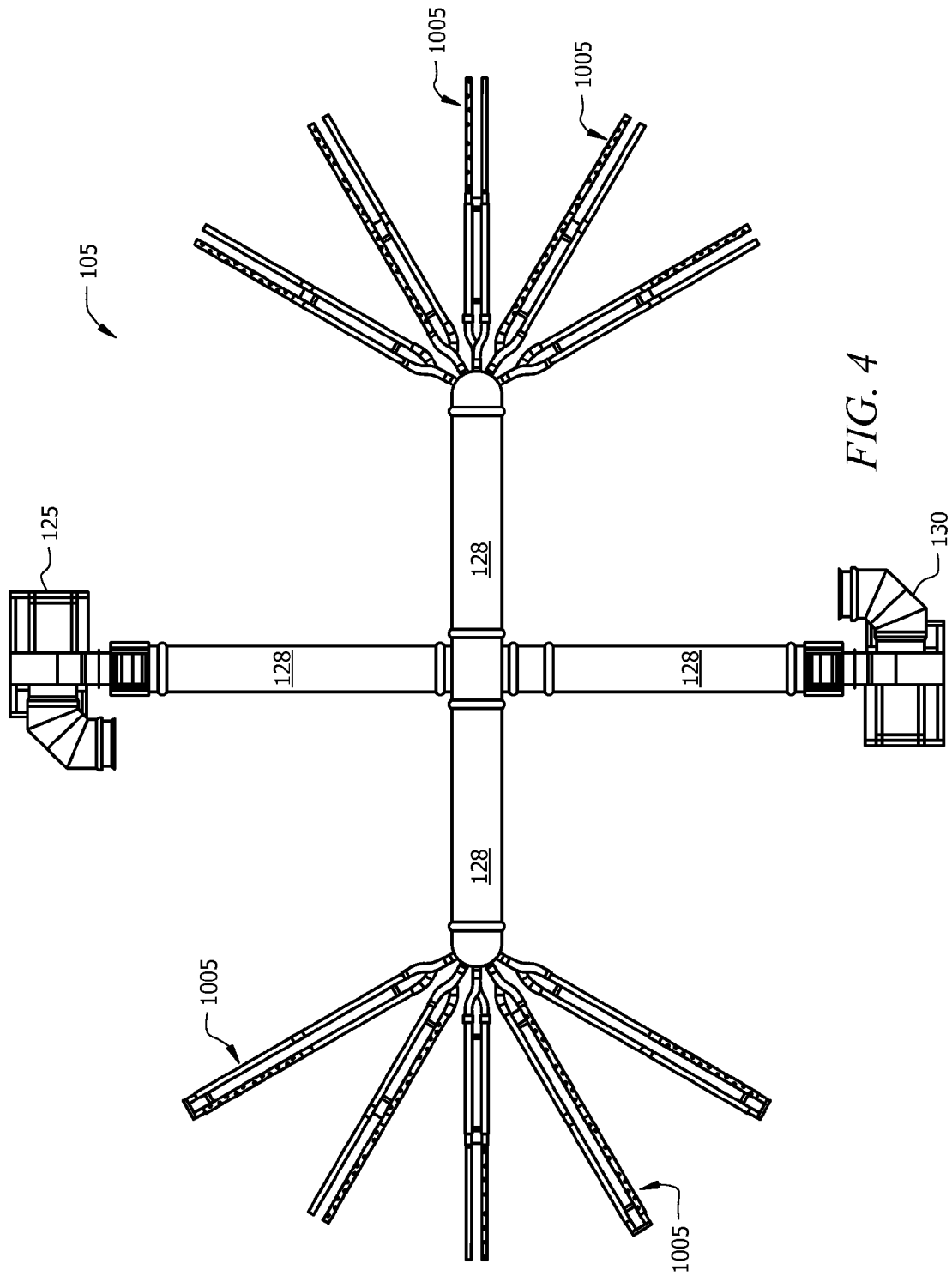
FIG. 4 illustrates a top view of an implementation of an example air transporter.
Figure 5:
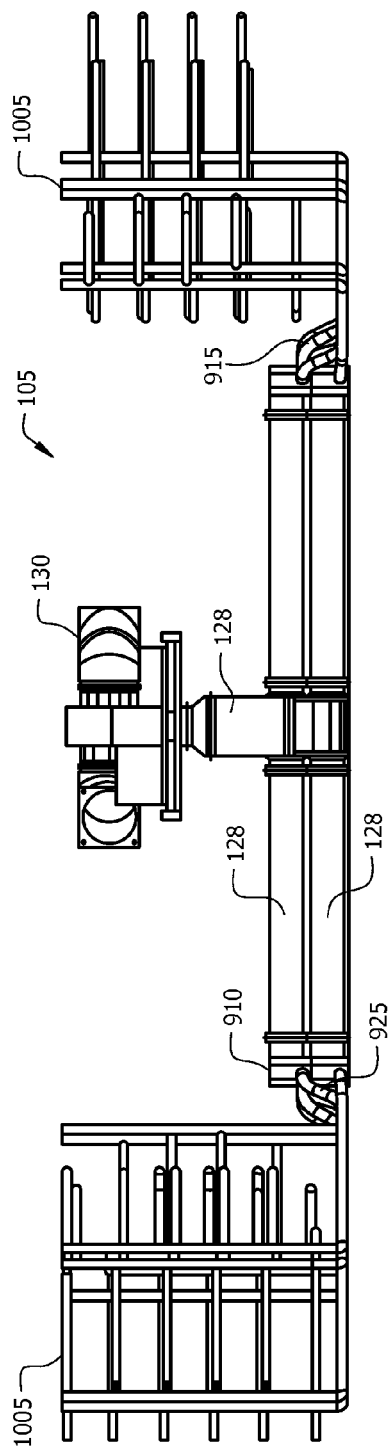
FIG. 5 illustrates a side view of an implementation of an example air transporter.
Figure 6:
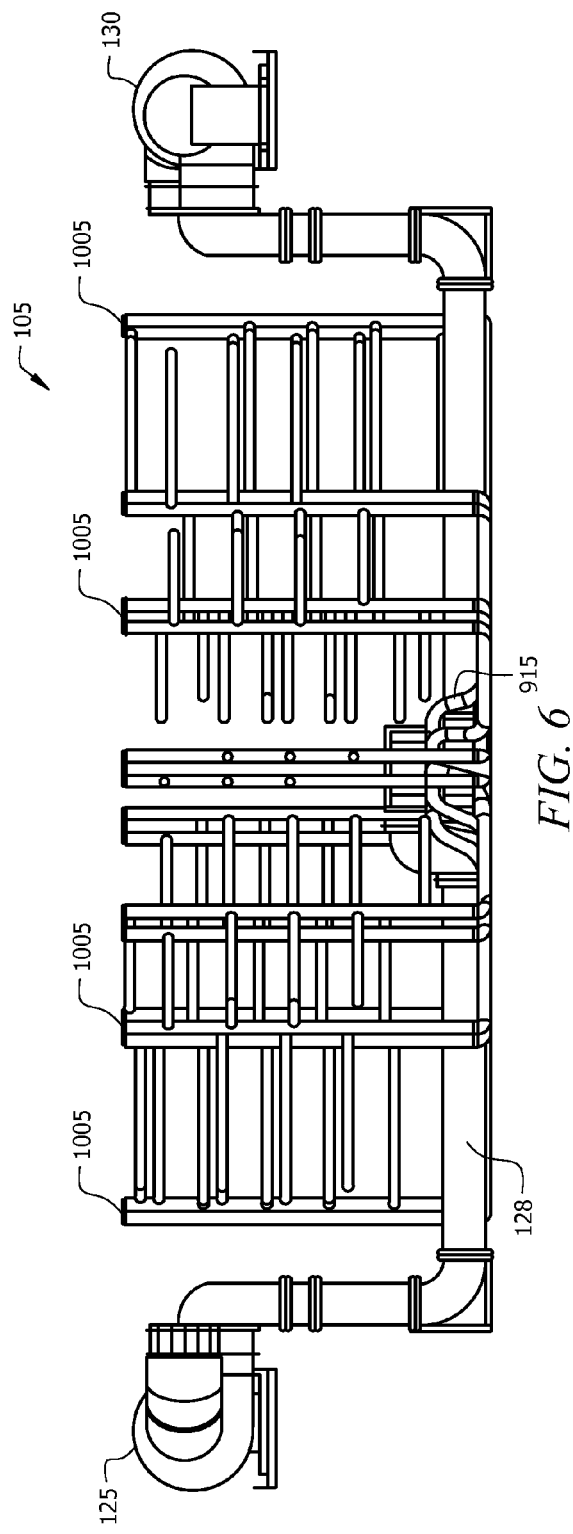
FIG. 6 illustrates a side view of an implementation of an example air transporter.

FIG. 1 illustrates a cut away view of a track oven 100. FIG. 2 illustrates an implementation of an example air transporter 105. FIG. 3 illustrates a top view of a cut away view of an implementation of an example track oven 100. FIG. 4 illustrates a top view of an implementation of an example air transporter 105. FIG. 5 illustrates a side view of an implementation of an example air transporter 105. FIG. 6 illustrates a side view of an implementation of an example air transporter 105.

A track oven 100 may include one or more components such as an air transporter 105 (e.g., convection system), a track 110, and one or more heaters (not shown). The oven 100 may include a housing. The housing may at least partially enclose the oven. Different portions of the oven may include different and/or the same components. For example, one or more first portions of the oven may include burner(s) 101, and one or more second portions of the oven may not include burner(s). In some implementations, a first portion of the oven may include a first segment of the track, such as a straight segment, and a second portion of the oven may include a second segment of the track, such as a curved segment.

The track 110 of the oven 100 may enter the oven through an inlet 102 and exit the oven through an outlet (not shown). At least a portion of the heaters and/or air transporter may be at least partially enclosed by the oven housing.

The track oven 100 may include tracks 110 in one or more spiral configurations. The track may include various segments, such as straight segments 115 (e.g., at least a portion of the track is approximately straight) and/or curved segments 120 (e.g., at least a portion of the track is approximately curved). The track may include a plurality of segments coupled together. One or more straight segments may be coupled to other straight segments. One or more curved segments may be coupled to one or more other curved segments. For example, a spiral track may include a plurality of straight segments, and at least a portion of the straight segments may be coupled to one or more curved segments. In some implementations, the spiral track may include segments disposed above other segments. As illustrated in FIG. 1, a spiral track may include one or more segments disposed above and/or below other segments of the spiral track.

As illustrated in FIGS. 1-6, a track oven 100 may include a single spiral track 110. The track oven 100 may include a double spiral track, as described in U.S. Pat. No. 6,138,660 entitled "Forced convective track oven having oval spirals" to Middleton, Jr., which is hereby incorporated by reference as if fully set forth herein. As described, the double spiral track may include an inner ascending spiral and an outer descending spiral. The track oven 100 may include tracks in a configuration with more than two spirals.

The track may include a drive chain that extends through the track and may support conveyor grids. The conveyor grids may be spaced at a predetermined distance from each other. The conveyor grids may receive and may transport containers through the track oven 100.

A track oven 100 may utilize heaters (not shown) to provide heat in the oven. The heaters may provide heat to bakery products in the containers on the track 110 of the oven 100 such that the bakery product is at least partially cooked. Heater(s) may include burners, such as ribbon burners that provide radiant heating from a burner flame. Radiant heating may be inefficient (e.g., when compared to heat transfer when utilizing radiant heating and convection heating). The burners 101 may be disposed in and/or proximate straight segments 115 of the track.

Heat from the heater(s) may increase the temperature of air proximate the heater(s). The air transporter 105 may be utilized to transfer the heated air from a first portion of the oven to a second portion of the oven. For example, the air transporter may transfer heated air proximate straight segments 115 of the track to curved segments 120 of the track. By allowing heated air from a first portion of the oven that is proximate a heater to be transferred to a second portion that is not proximate a heater, the temperature of the second portion may be raised. For example, since the second portion may not be proximate a heater, the temperature may be lower than portions of the oven proximate heater(s). In some implementations, the first portion and the second portion may overlap (e.g., the air may be mixed between the portions since the oven may not enclose various segments of the track separately). Transferring the heated air may also allow a temperature across the oven to be more uniform (e.g., more even temperature distribution).

In some implementations, transferring the heated air may allow a temperature of the oven to be controlled in various portions of the oven. For example, the oven may be capable of achieving different temperatures in different portions by controlling the transport of heated air. A track oven may be utilized for different types of bakery products and the temperature may be controlled to accommodate the different oven settings (e.g., temperature) for each type of bakery product.

In some implementations, the air transporter 105 may include fans 125, 130 (e.g., recirculating fan) and ducting 128. As illustrated, the upper fan 125 and/or lower fan 130 may be coupled to opposing walls. By coupling the fans to opposing walls of the oven, the heated air from the heaters may be more efficiently utilized by the air transporter (e.g., the fans may draw air from areas of the oven with less overlap than when the fans are positioned on a same wall). The fans may be coupled to walls (not shown) of the oven 100.

The fans may include one or more upper fans 125 and one or more lower fans 130. The upper fan(s) 125 may be coupled to duct(s) 150 that provide heated air to an upper surface of a bakery product and/or an upper surface of a container. The lower fan(s) 130 may be coupled to duct(s) that provides heated air to a lower surface of a bakery product and/or a lower surface of a container.

Figure 7:
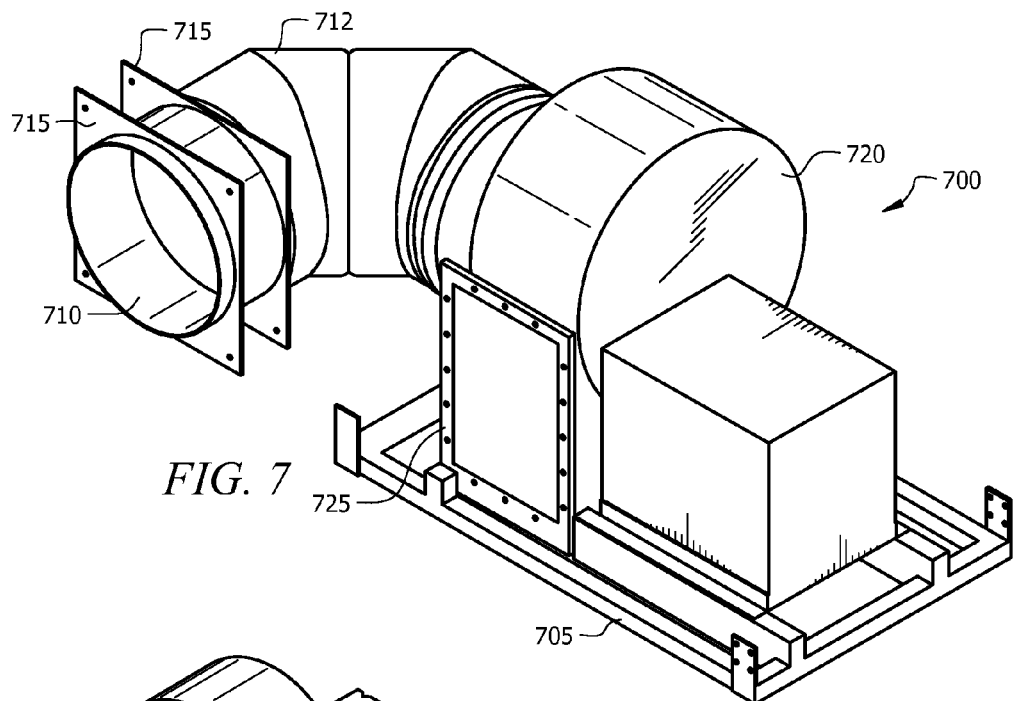
FIG. 7 illustrates an implementation of a portion of an example air transporter.
Figure 8:
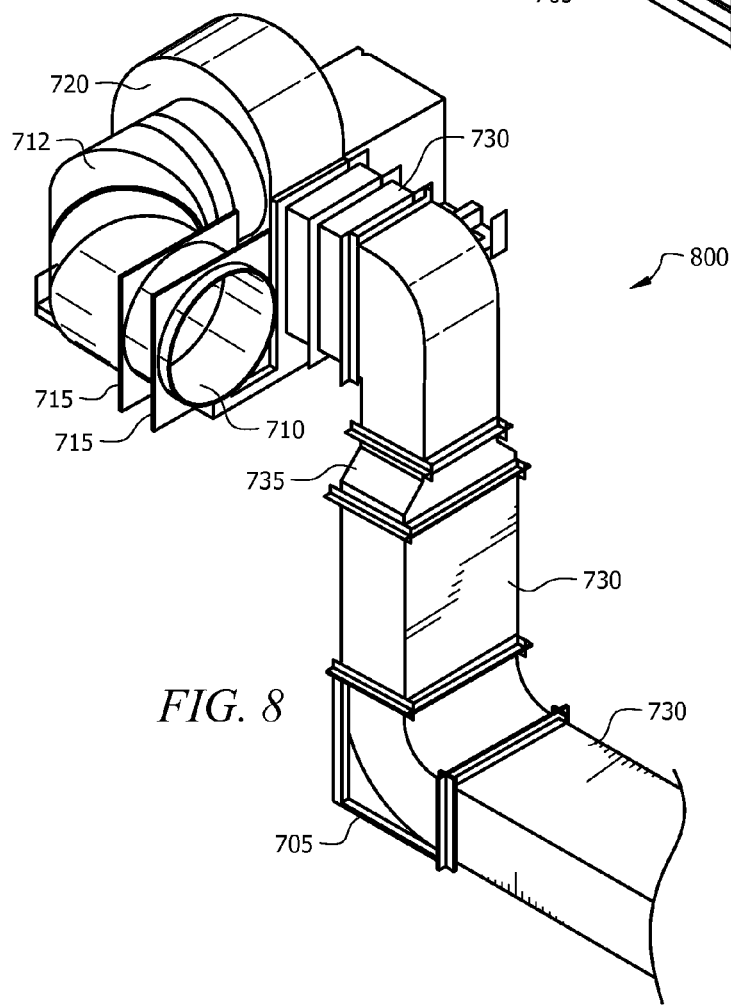
FIG. 8 illustrates an implementation of a portion of an example air transporter.

FIG. 7 illustrates an example of a portion 700 of an example air transporter. FIG. 8 illustrates an implementation of an example of a portion 800 of an example air transporter 800. As illustrated, the fan assembly (e.g., fan, ducting, and/or portions thereof) may be coupled to a surface (e.g., floor, wall, and/or roof) of an oven. The fan assembly may be mounted to a surface using a skid 705 or other appropriate coupling member. The fan assembly may include an intake 710. The intake 710 may be positioned in a portion of the oven proximate a heater, in some implementations. For example, the intake 710 of the fan may be disposed above a heater. Since warm air may rise to an upper portion of the oven, the intake 710 may be disposed proximate an upper portion of the oven and proximate at least one of the heaters, as illustrated in FIGS. 1 and 3. The intake 710 may include flashing (e.g., roof flashing when the fan assembly is coupled to a portion of the roof of an oven) and may be coupled to an intake duct 712. The intake duct 712 may allow heated air to be drawn from the intake 710 to the fan 720. The heated air may be expelled from the fan 720 through a discharge 725. The heated air may be transported to portions of the oven via ducts 730, 130. The duct 730 may include an expansion duct 735.

Figure 9:
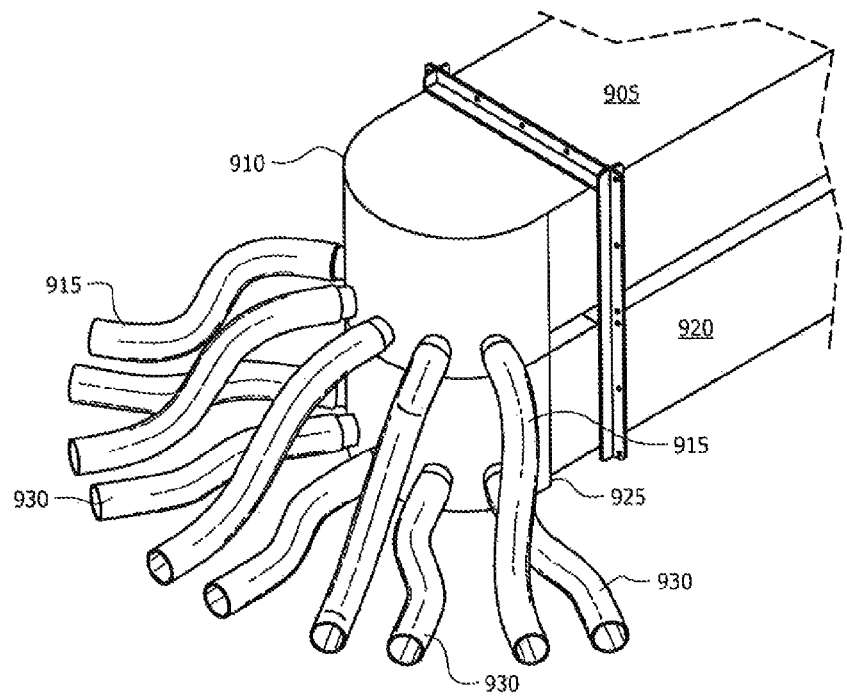
FIGS. 9-26 illustrate implementations of example portions of a air transporter.
Figure 10:
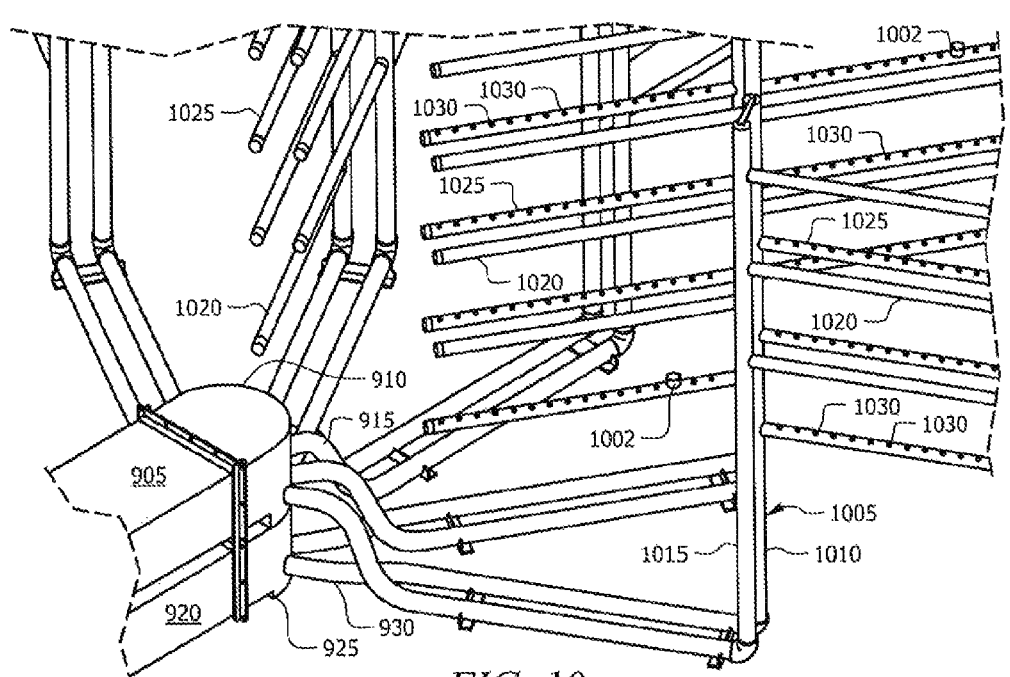
Figure 11:
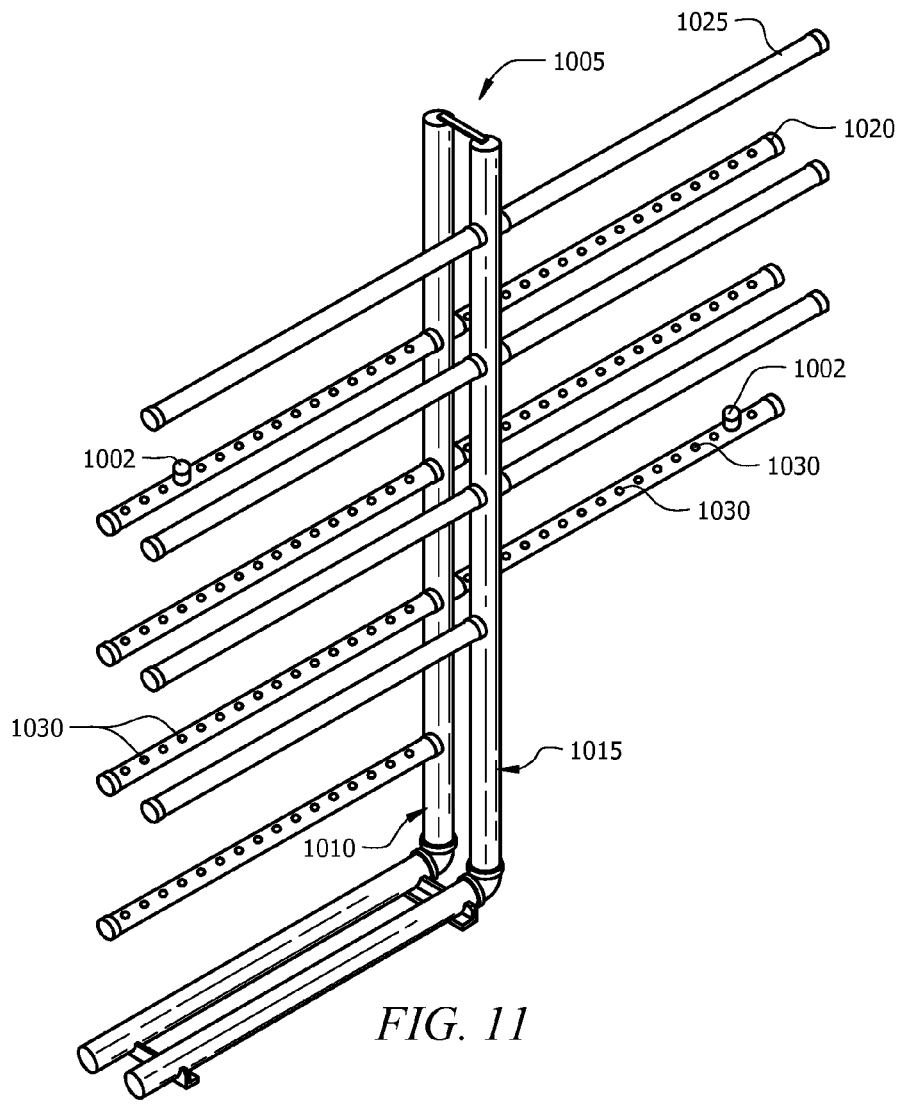
Figure 12:
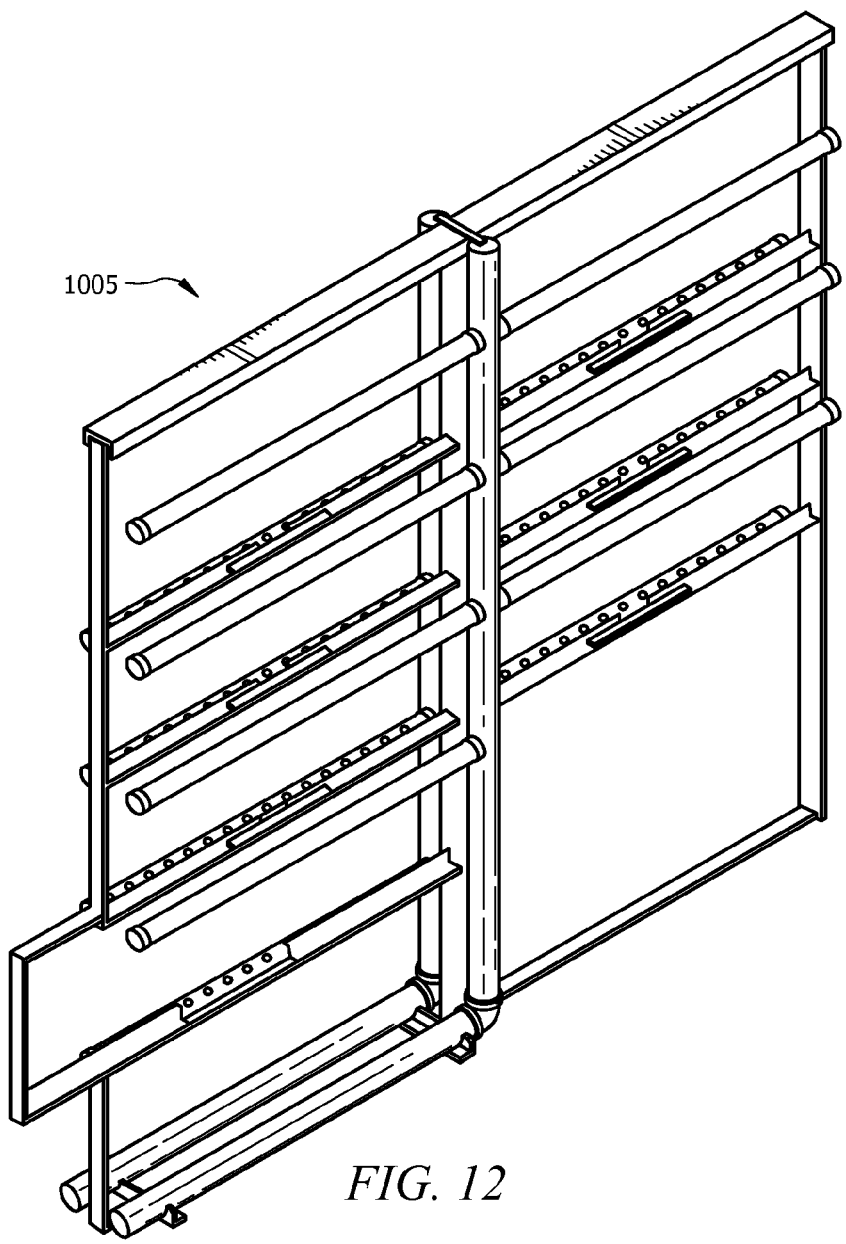
Figure 13:
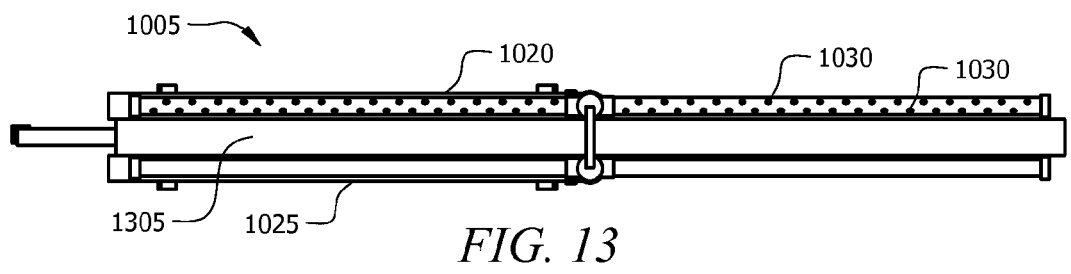

The duct 730 may be coupled to plenum and/or flexible tubing (e.g., a hose of any appropriate cross-sectional shape) of the ducting to transfer the heated air from the fan(s). FIG. 9 illustrates a portion 900 of the ducting of the air transporter. FIG. 10 illustrates a portion 1000 of the ducting of an air transporter. One or more fans are coupled to a duct 730 (e.g., separate upper and/or lower ducts). The upper duct 905, coupled to at least one upper fan, is coupled to an upper plenum 910 and upper flexible tubing 915. The lower duct 920, coupled to at least one lower fan, is coupled to a lower plenum 925 and lower flexible tubing 930.

The flexible tubing may be coupled to a tubing arrangement that delivers the heated air to a surface of the bakery product and/or container. The tubing arrangement may be a tree shaped tubing arrangement, in some implementations, as illustrated in FIGS. 1-6 and 10-26. As illustrated, the tubing arrangements may vary and may include branches in a single direction and/or multiple directions. The tubing arrangements may be disposed in curved segments of the track. The tubing arrangement may be spaced evenly and/or unevenly about the curved segment(s) of the track. By allowing the tubing arrangements to be disposed about curved segments of the track that do not receive direct heating from heating elements, heat may be provided to the curved segments of the track by the heated air from the fans and/or ducting. By providing heat to segments of the track that are not directly heated by heaters, operations of the oven may be improved (e.g., costs may decrease due to use of heated air as a byproduct of heating the bakery products with radiant heat from heaters and/or quality of bakery products may be improved through improved control and/or variable control throughout the oven).

As illustrated in FIG. 10, the flexible hose 915, 930 is coupled to a tree structure that includes a main structure, such as a stem 1005 and branches 1020, 1025. A branch, such as branches 1020, 1025, may include openings disposed across a length of the branch. For example, a first branch may include openings disposed across a first branch in a first arrangement and/or a second branch may include openings disposed across a second branch in a second arrangement. The first arrangement and the second arrangement may be similar or different. In some implementations, the first branch may be disposed above a segment of track and the second branch may be disposed below the same segment of track. The first arrangement of openings in the first branch and/or the second arrangement of openings in the second branch may direct air proximate a top surface and/or bottom surface of a container and/or bakery product. For example, a first portion of the first branch may include openings that direct air proximate a top surface of a container and a second portion of the first branch may include openings that direct air proximate a bottom surface of a container. In some implementations, the openings in a branch may be directed towards the same region of a container and/or bakery product (e.g., a top surface and/or a bottom surface of a container and/or bakery product).

The positioning of the branches (e.g., on the stem and/or relative to each other) may be selected such that an upper branch is disposed above a track and a lower branch is disposed below the same segment of the track. As illustrated, the stem 1005 includes lower tubing 1010 for transporting the heated air from the lower fan and lower ducting 920 and upper tubing 1015 for transporting the heated air from the upper fan and upper ducting 905. The lower tubing 1010 may be coupled to one or more lower branches 1020. The upper tubing 1015 may be coupled to one or more upper branches 1025.

Figure 14:
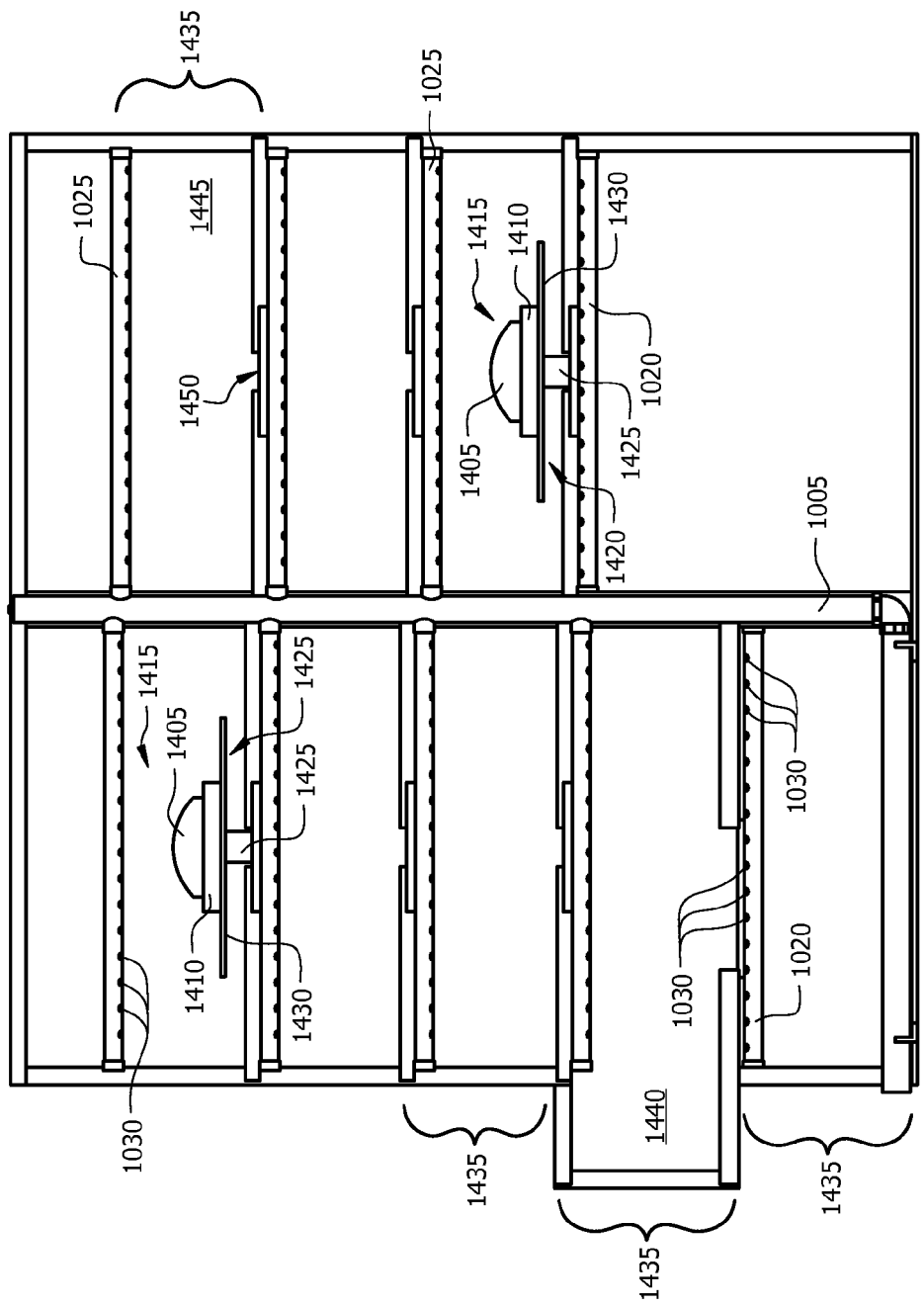
Figure 15:
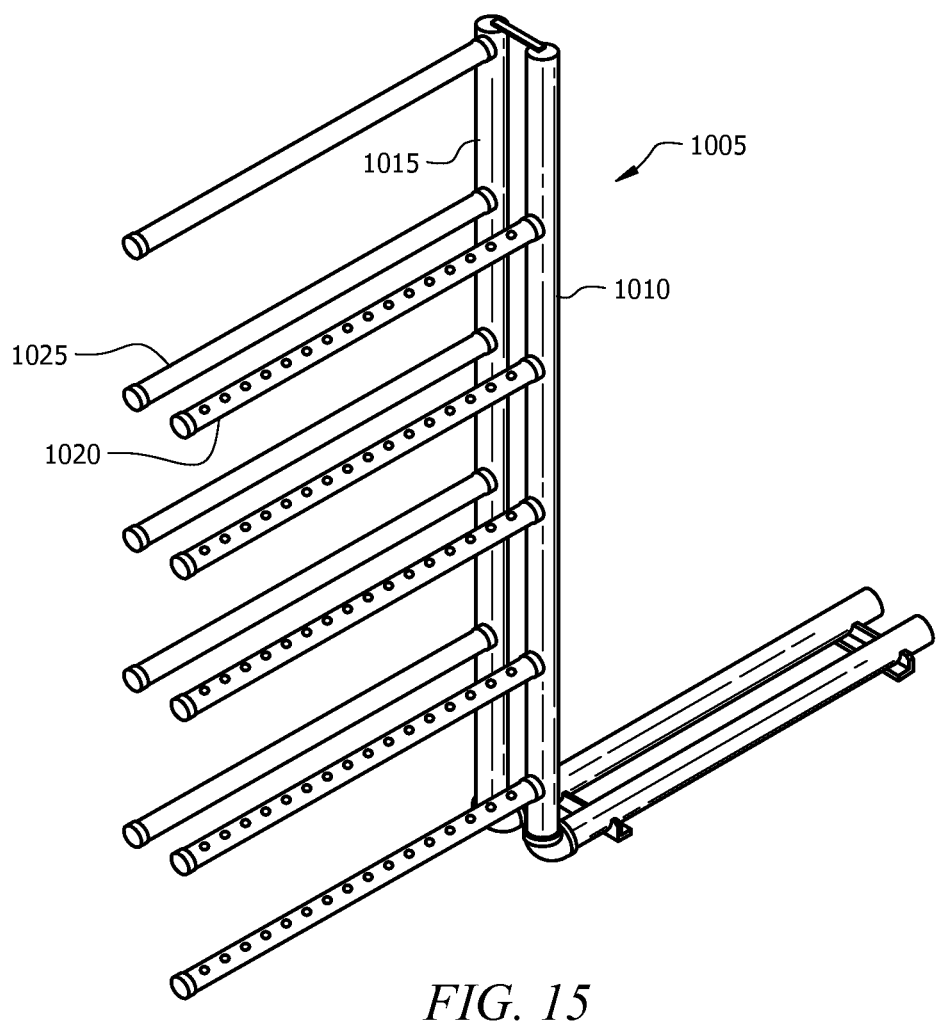

For example, as illustrated in FIG. 14, the stem 1005 may include a plurality of sets of upper branches 1025 and lower branches 1020, where each set of upper and lower branches deliver air to surfaces 1415, 1420 of a bakery product 1405 and/or its respective container 1410. As the track (e.g., chain drive 1425 and/or grids 1430) guides the bakery product and/or container through a set of branches, the air from the upper branch(es) flows proximate an upper surface 1415 of the bakery product and/or container and the air from the lower branch(es) flows proximate a lower surface 1420 of the bakery product and/or container.

The lower branch 1020 and/or upper branch 1025 may include a plurality of openings 1030. For example, the openings 1030 may be approximately ¼ inch openings in a tubing of a branch. The openings 1030 may be spaced approximately every 2 inches. A branch (e.g., upper and/or lower branch) may be at least 6 feet long. The branches may include similar and/or dissimilar openings (e.g., similar size, number, and/or spacing). The openings may be evenly spaced across a branch and/or be disposed in a part of the branch The openings 1030 may allow heated air delivered from a fan via the ducts to flow to a portion of the oven and/or upper surfaces 1415 and/or lower surfaces 1420 of the bakery product 1405 and/or container 1410. For example, the openings 1030 may deliver air heated by the heater to areas that are not directly heated by the heater and/or areas proximate curved portions, and/or proximate areas away from the heater. The openings 1030 in the upper branch 1025 may allow heated air from the upper fan to be delivered proximate an upper surface 1415 of a bakery product 1405 and/or container 1410. The openings 1030 in the lower branch 1020 may allow heated air from the lower fan to be delivered proximate a lower surface 14020 of a bakery product 1405 and/or container 1410.

In some implementations, an amount of heated air allowed to flow through a branch may be controlled by altering the openings of a branch. For example, a plug (e.g., a heat resistant pipe plug) may restrict flow through one or more of the openings. By restricting the flow of heated air through an opening, a velocity of heated air flow, a direction of heated air flow, temperature of a bakery product, and/or coloring of a bakery product may be controlled. In some implementations, a ratio of an amount of heated air allowed to flow through an upper branch to an amount of heated air allowed to flow through a lower branch may be approximately 1: approximately 1 and/or approximately 2: approximately 1.

In some implementations, the amount of heated air delivered to each set 1435 of upper branches 1025 and/or lower branches 1020 may be controlled individually and/or collectively. For example, a first set 1440 may be controlled to obtain a first operating parameter (e.g., temperature and/or coloring) and a second set 1445 may be controlled to obtain a second operating parameter. The first and the second operating parameters may be similar and/or dissimilar. For example, the first set 1440 may include heated air provided through an upper branch 1025 and may not include a lower branch 1020 and/or allow restricted flow through a lower branch. The second set 1445 may allow heated air to be provided through the upper branch 1025 and lower branches 1020. Thus, a flow of heated air through the stem 1005 may be distributed to the branches based on operating parameters (e.g., for a type of bakery product, to accommodate more than one type and/or size of bakery product, and/or to accommodate for properties of the bakery product identified during use, such as coloring).

Figure 16:
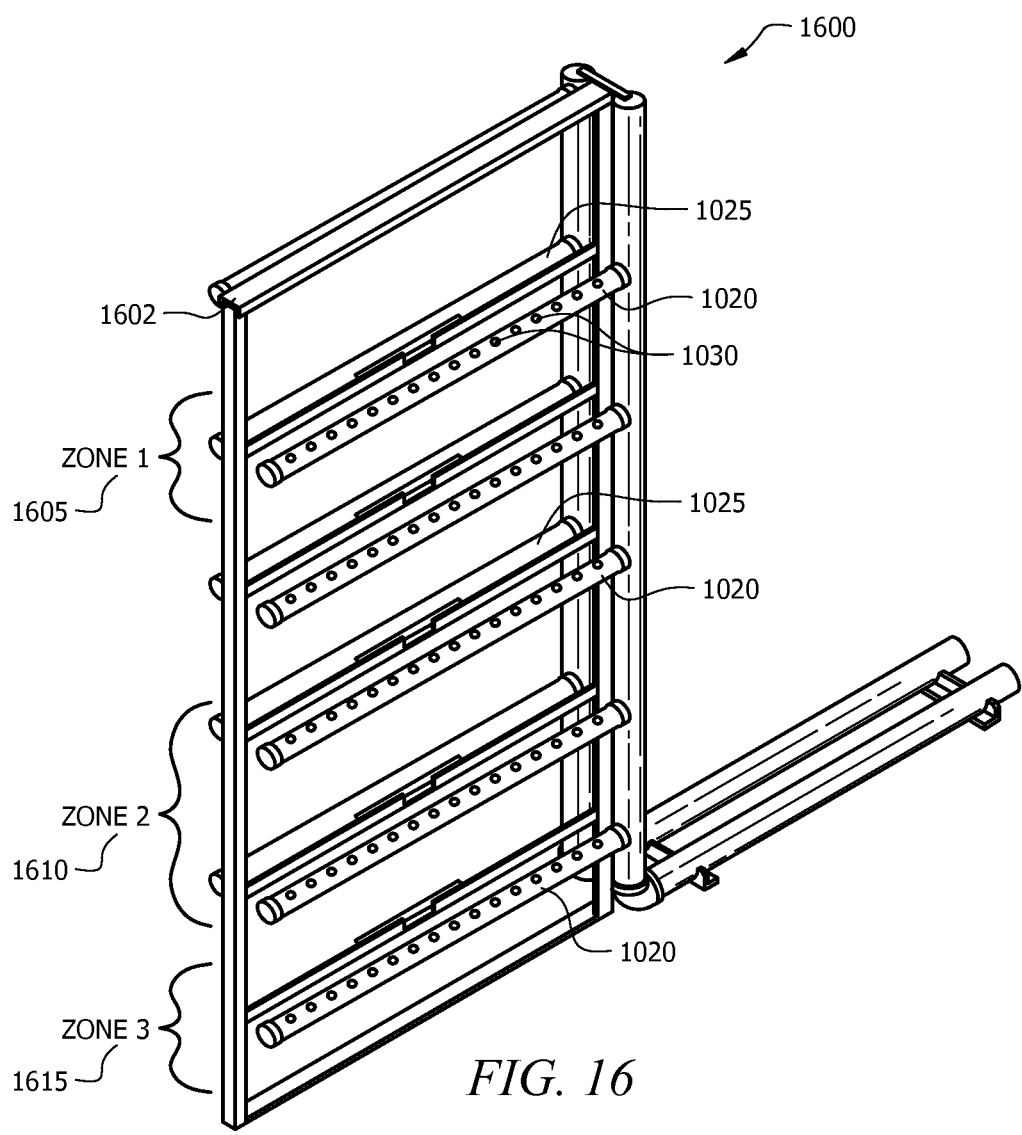
Figure 17:
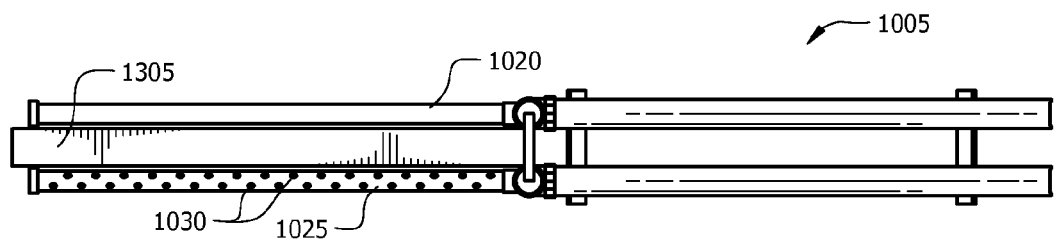
Figure 18:
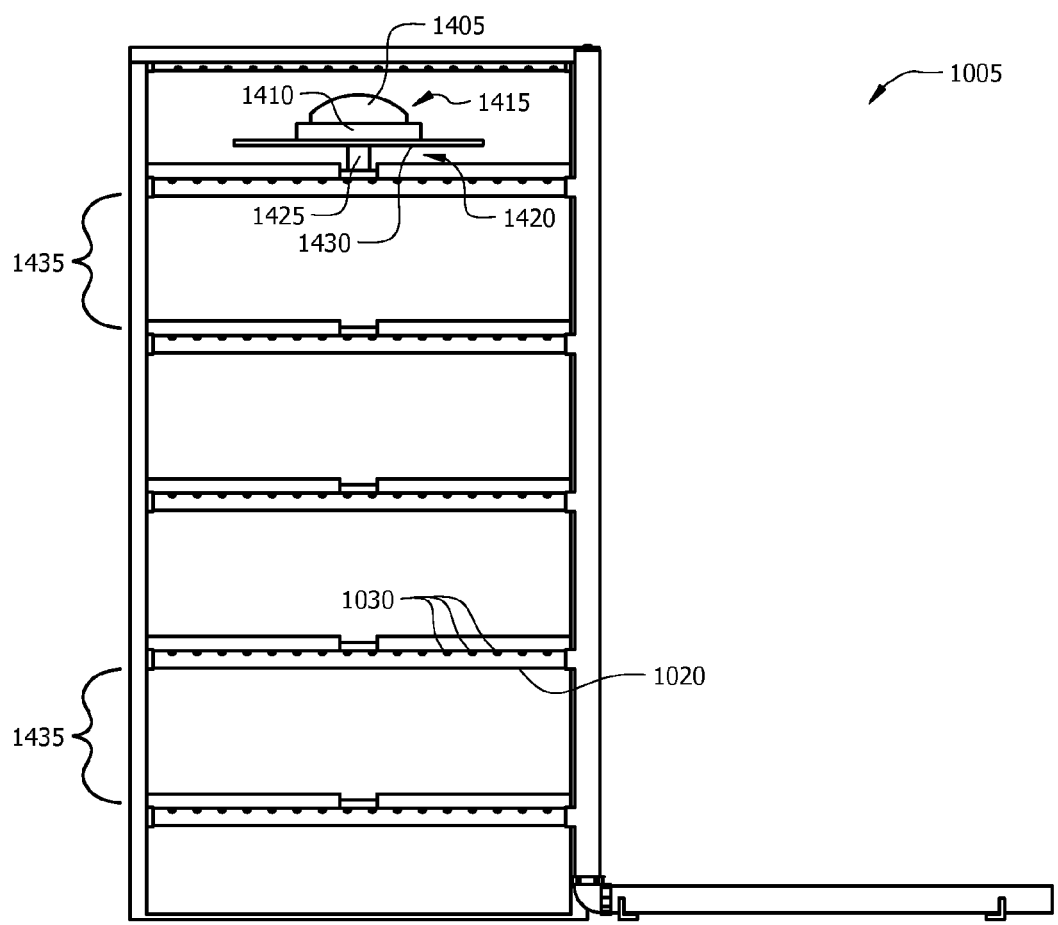
Figure 19:
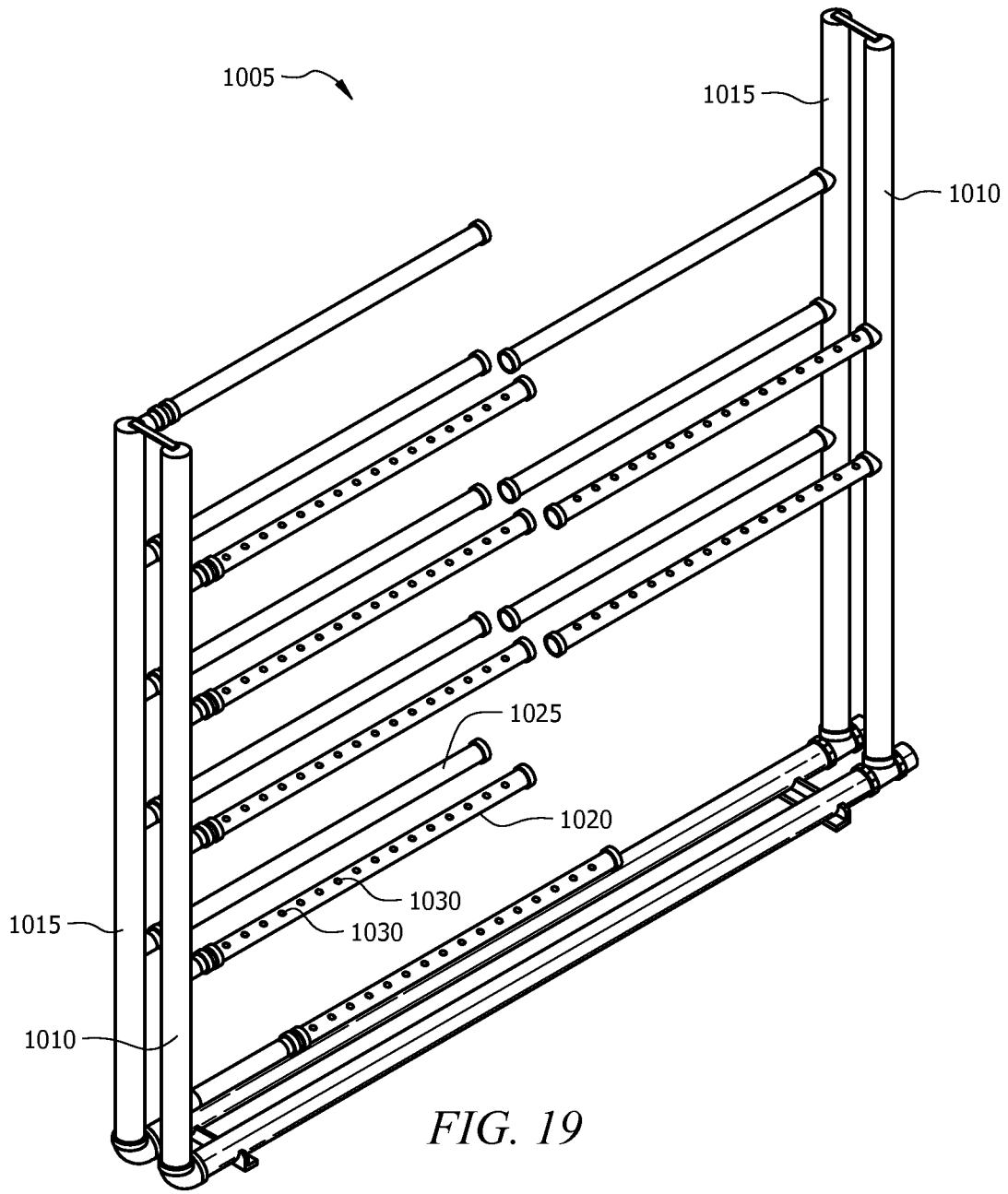
Figure 20:
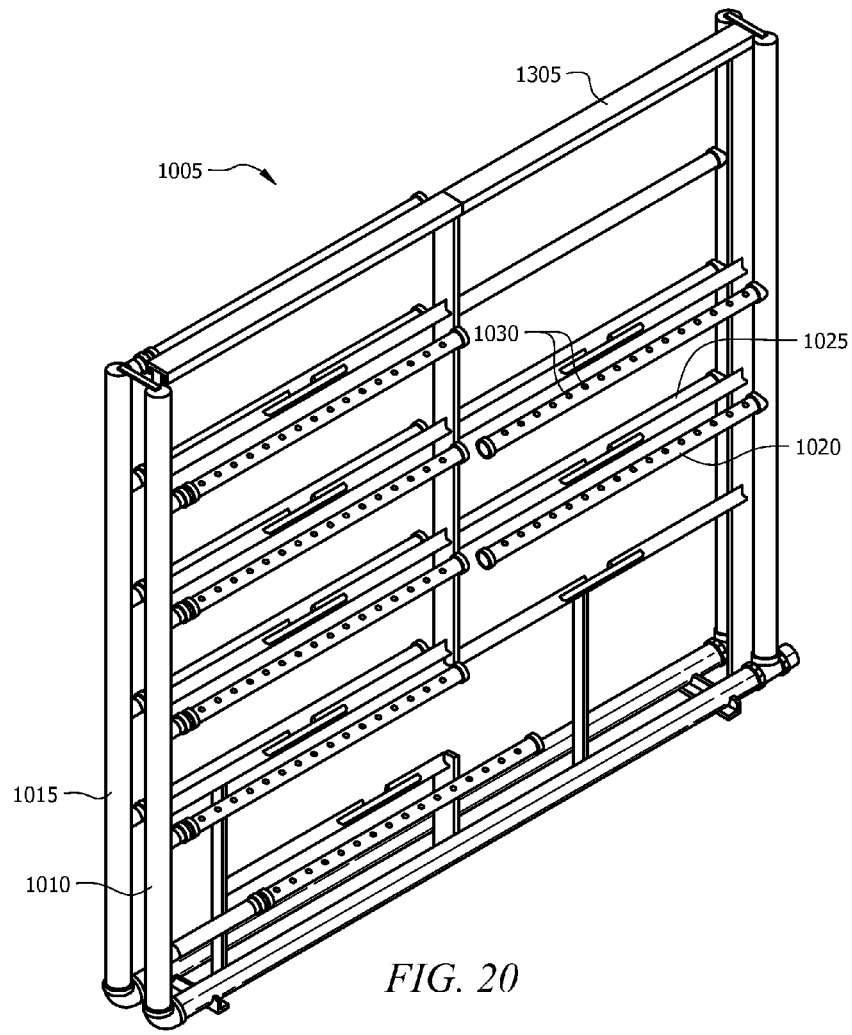
Figure 21:
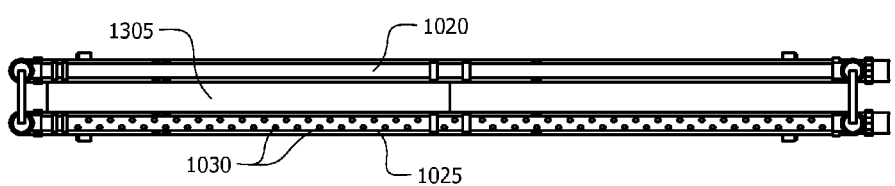
Figure 22:
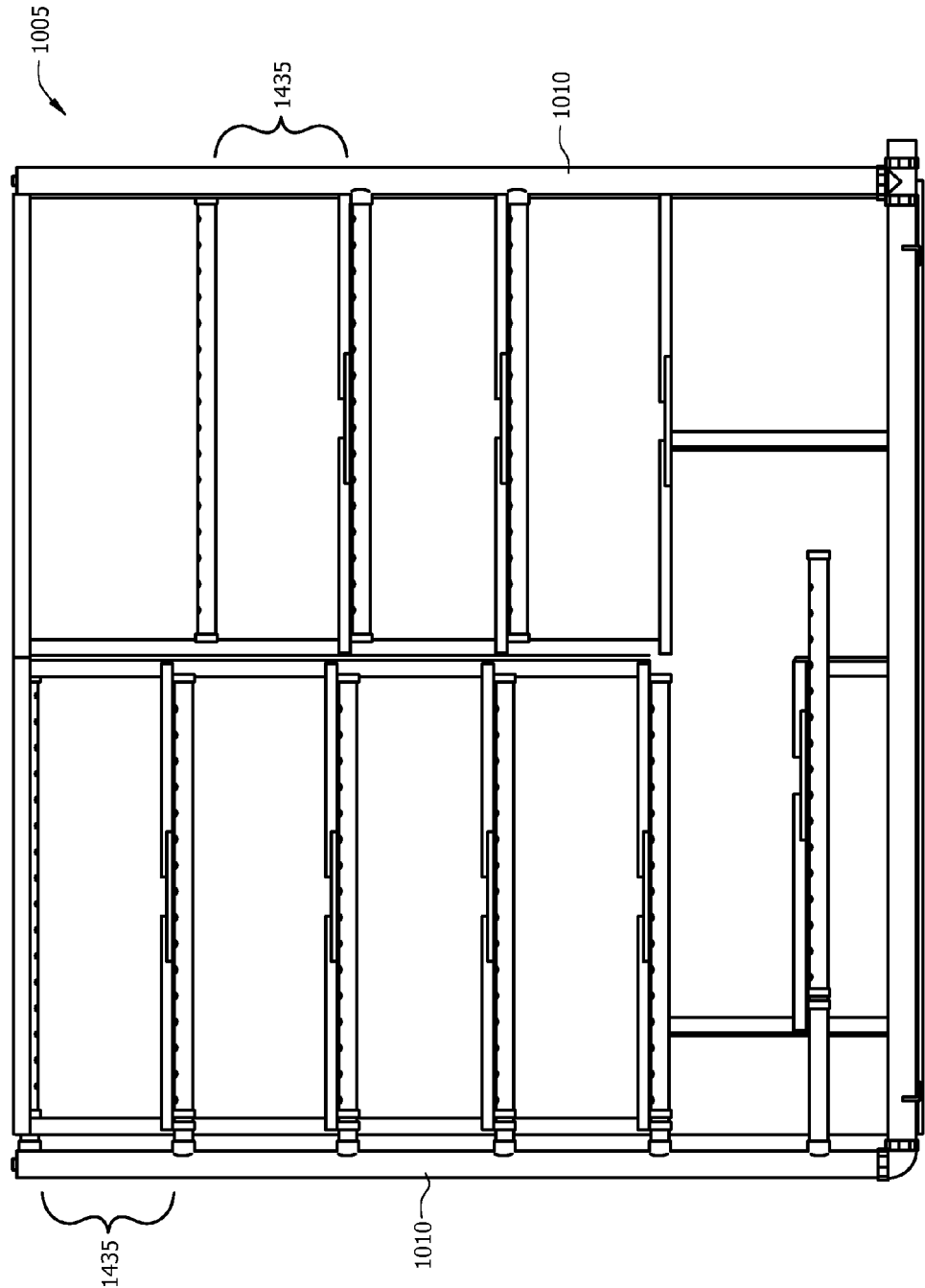
Figure 23:
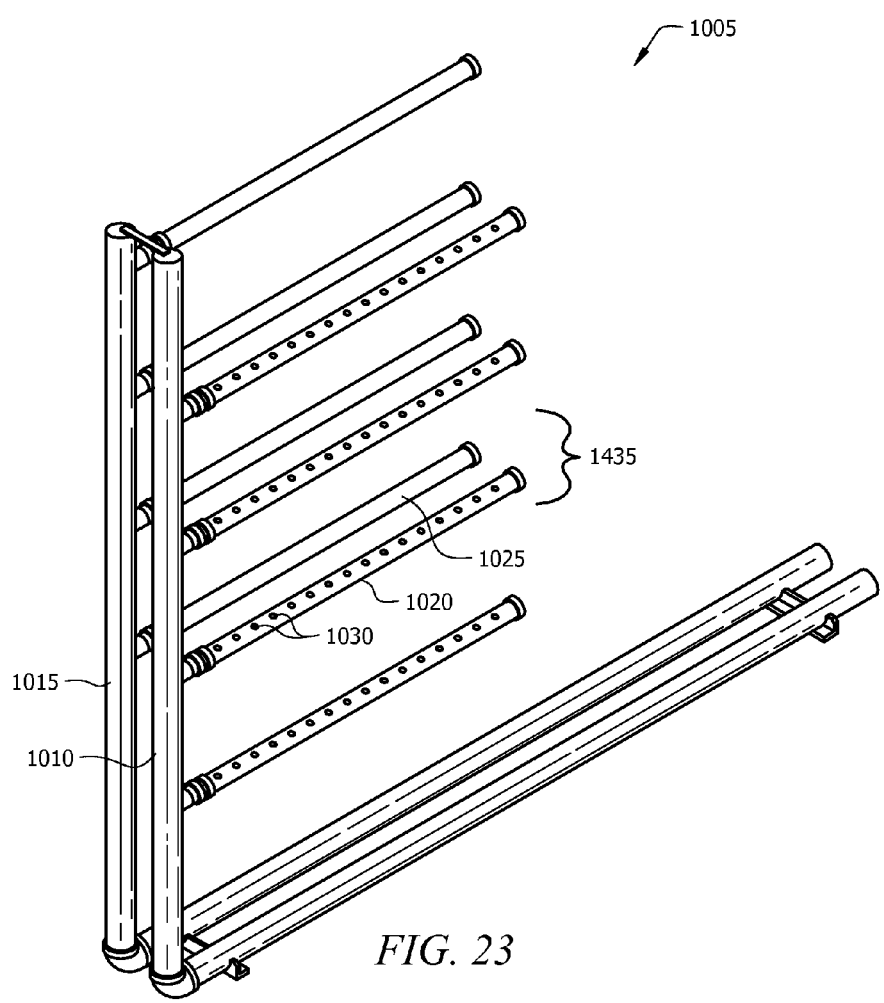
Figure 24:
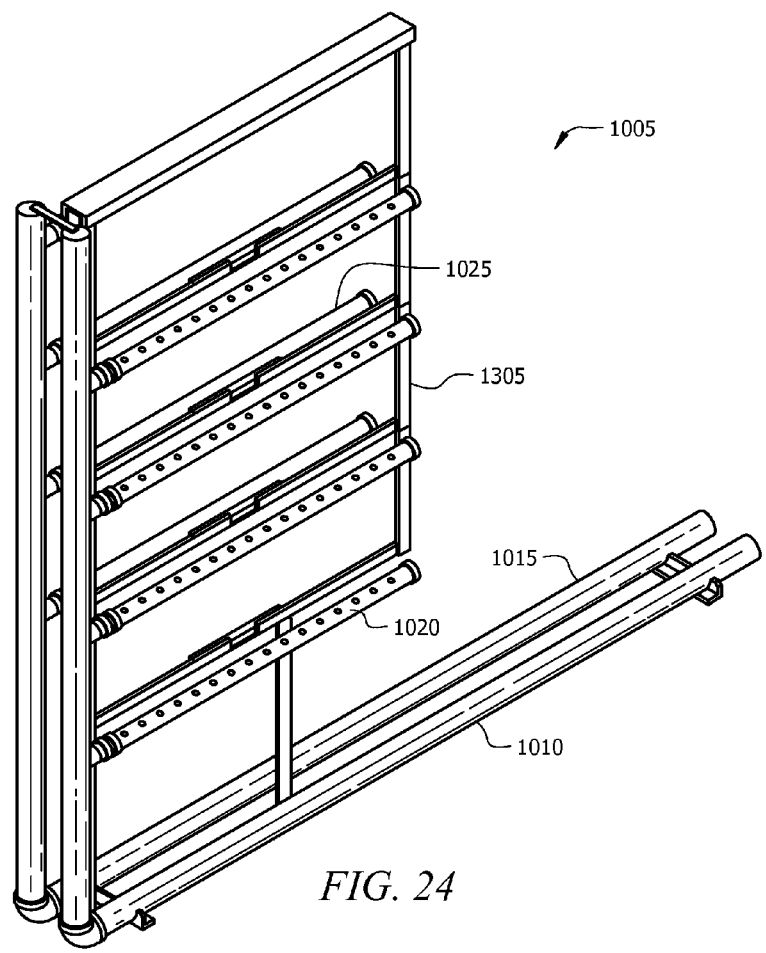
Figure 25:
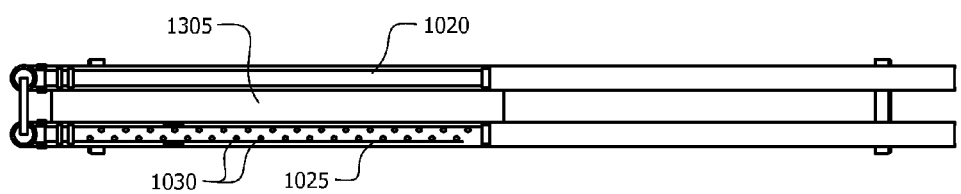
Figure 26:
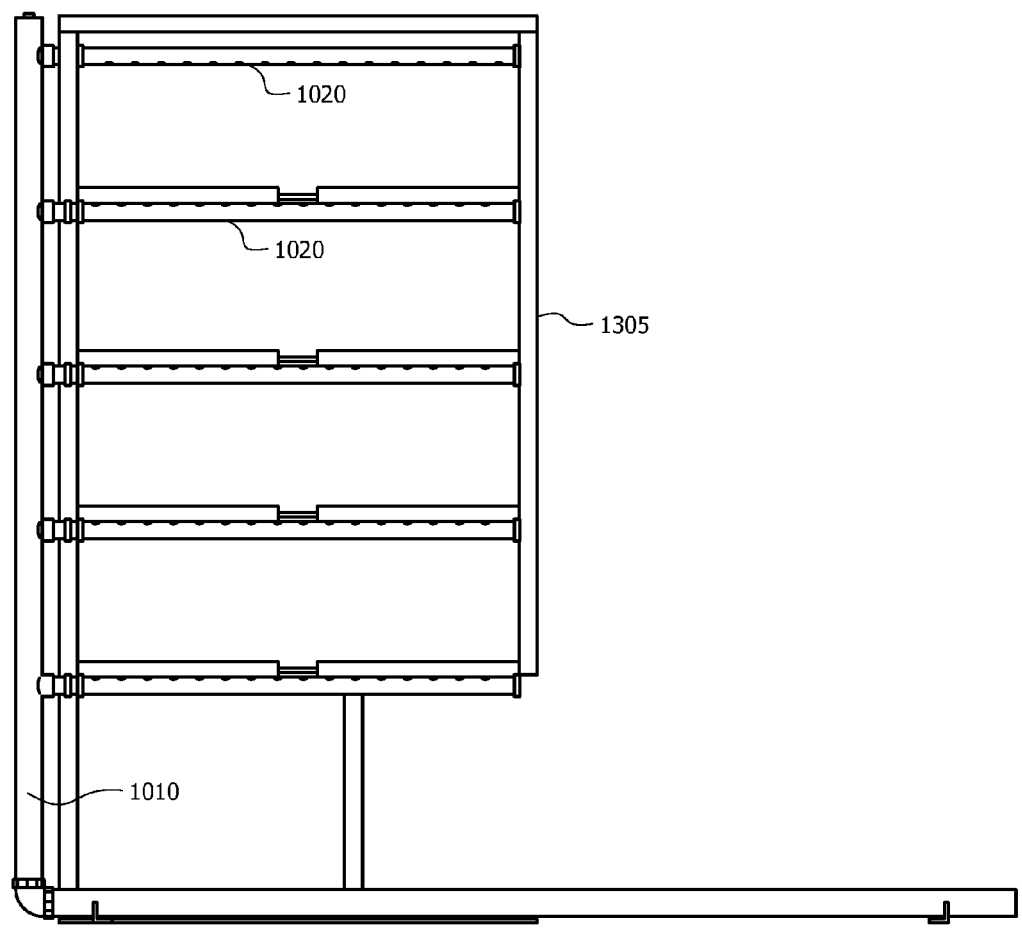

In some implementations, by controlling the amount of heated air allowed to flow through the branches (e.g., upper and/or lower branches) different zones may be created within the oven. FIG. 16 illustrates an implementation of a portion 1600 of an example air transporter. The sets of upper branches 1025 and/or lower branches 1020 may create zones 1605, 1610, 1615 in the oven. The zones may have approximately similar and/or dissimilar properties. The properties of the zones may be controlled based on the operating parameters. Thus, different zones may be created for different bakery products and/or different stages in during a residence time of a bakery product in the oven. In some implementations, a zone may have a first property (e.g., number of openings, number of plugs, operating temperature, etc.) at a first time during operation and adjusted to have a second property at a second time during operation.

In some implementations, the spacing between an upper branch and a lower branch may be selected based on the types of bakery product that are processed by the oven. For example, when bread loaves are baked in the oven, at least 13 inches may be allowed between the upper and the lower branches. When buns are baked in the oven, at least 9 inches may be allowed between the upper and the lower branches.

Figure 27:
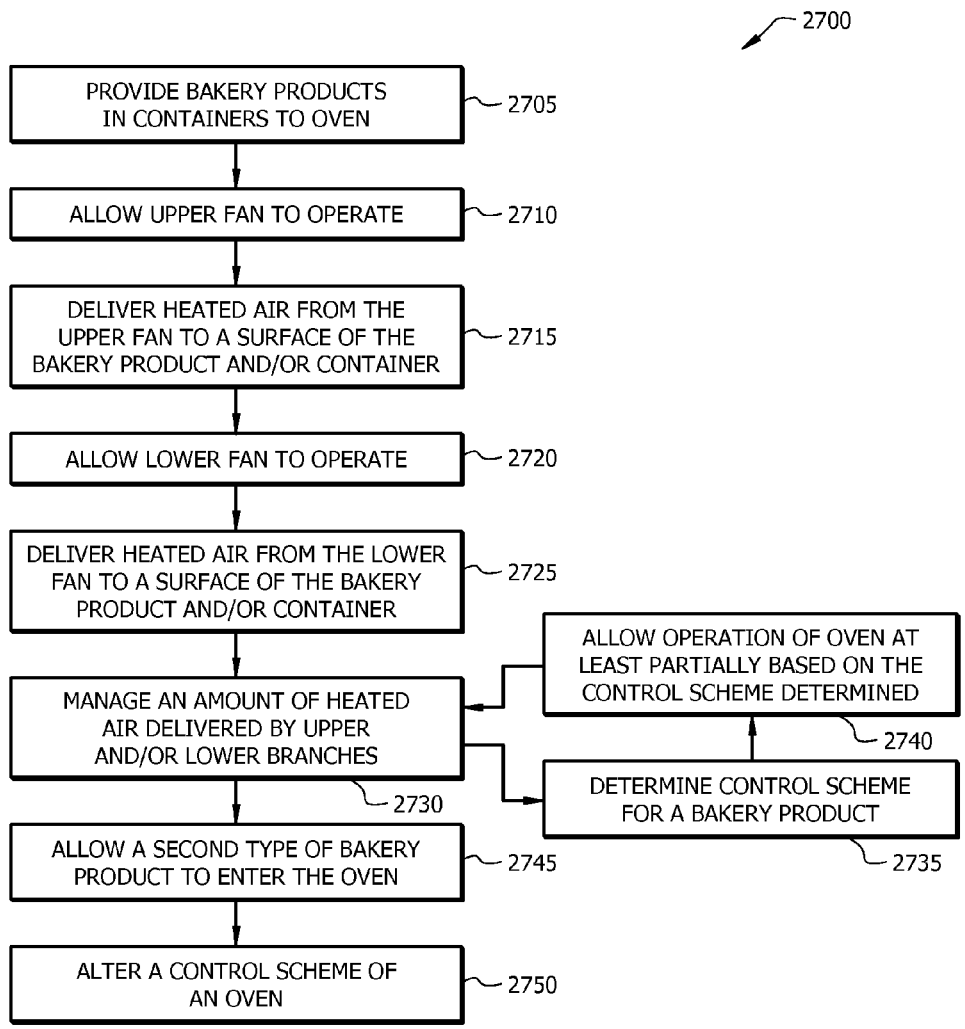
FIG. 27 illustrates an implementation of an example process for operating an oven.
Figure 28:
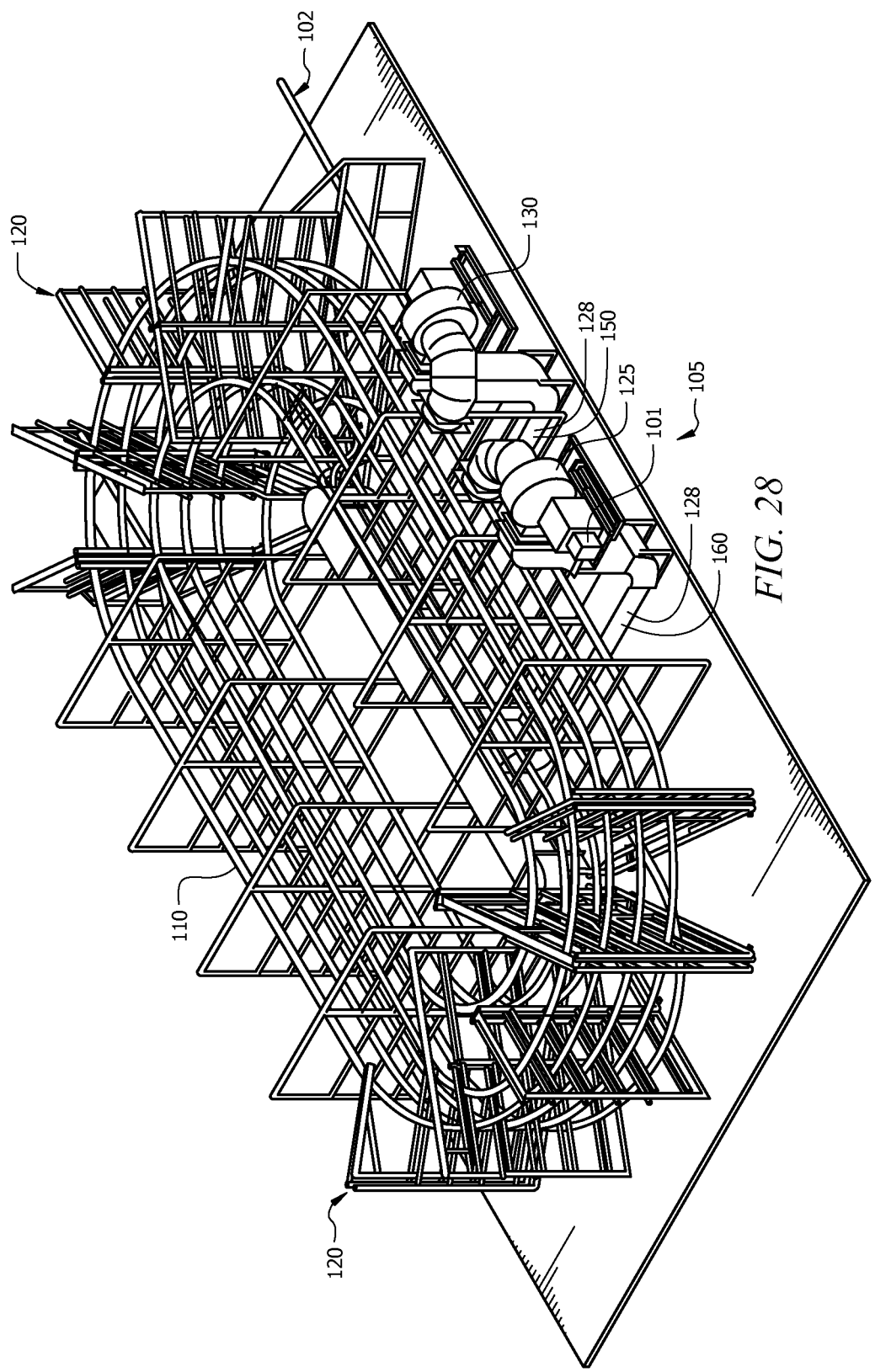
FIG. 28 illustrates a cut away view of an implementation of an example track oven.
Figure 29:
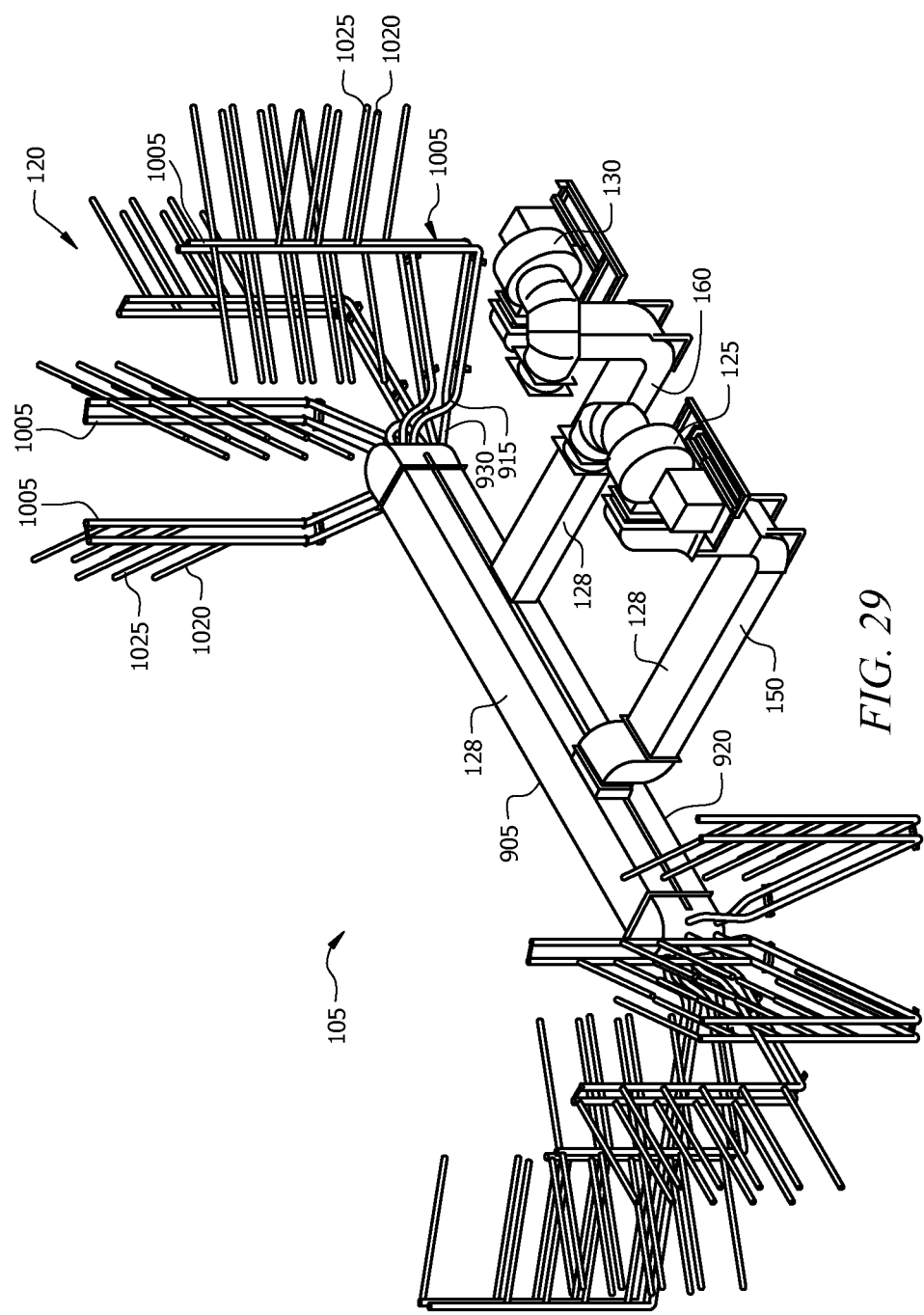
FIG. 29 illustrates an implementation of an example air transporter.
Figure 30:
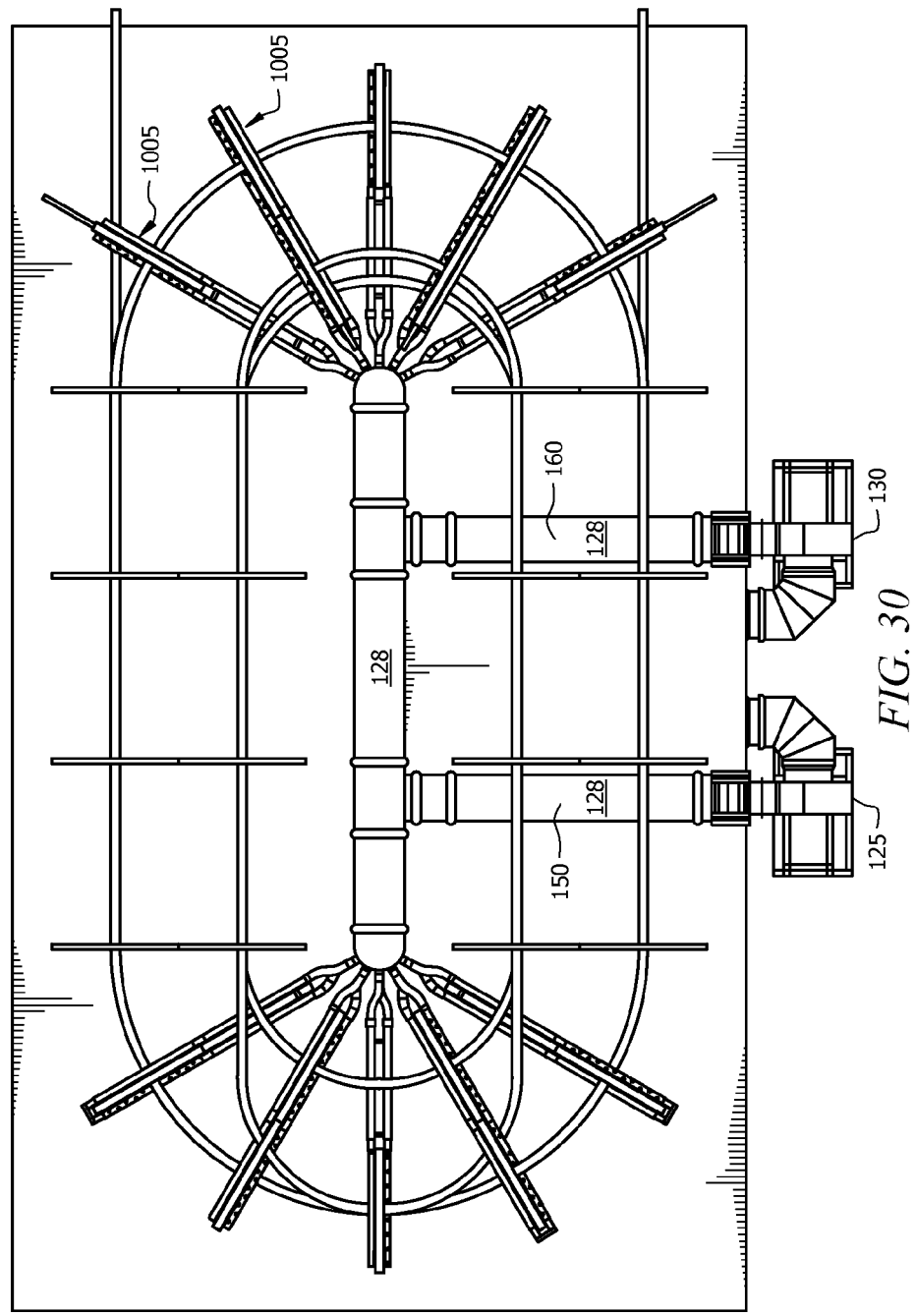
FIG. 30 illustrates a top view of a cut away of an implementation of an example track oven.
Figure 31:
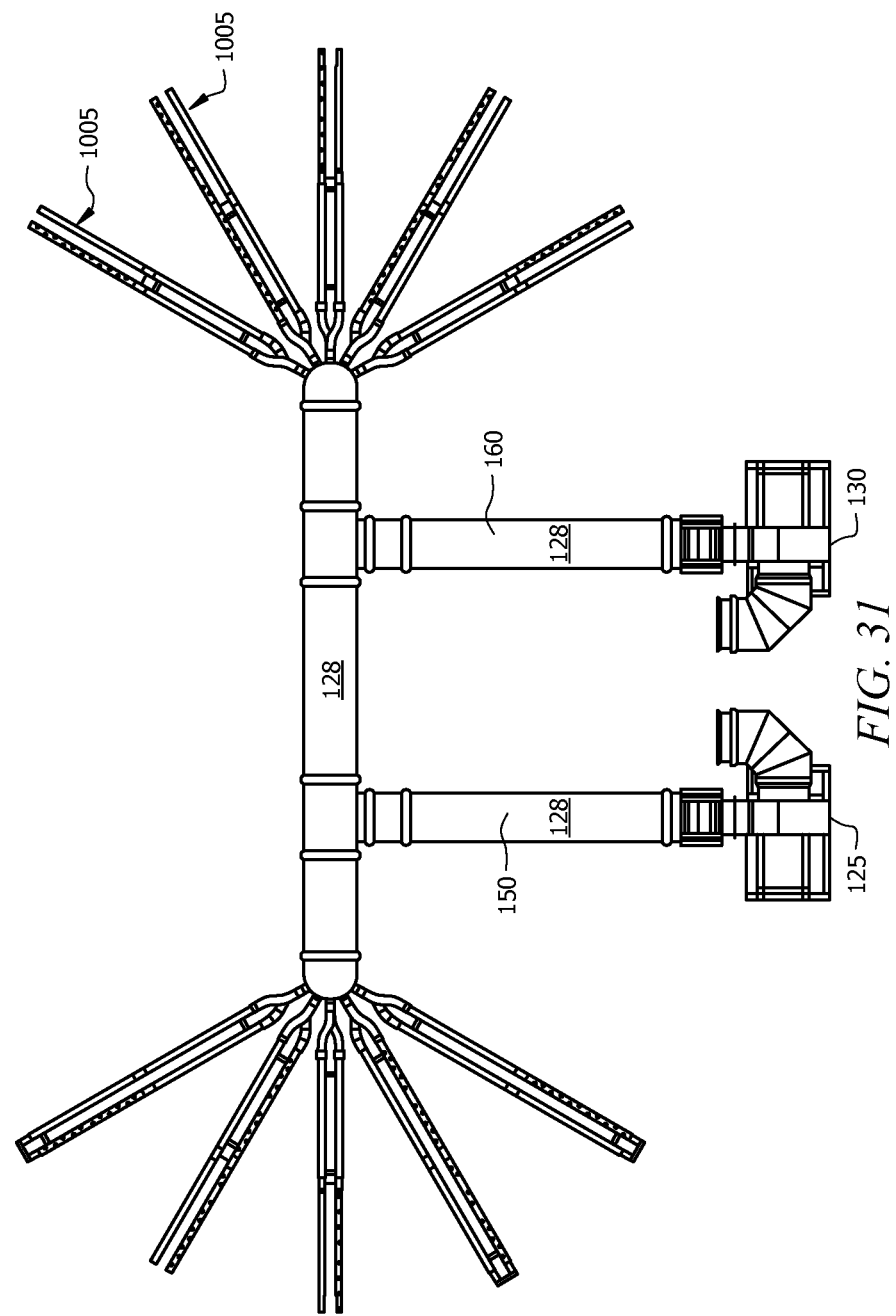
FIG. 31 illustrates a top view of an implementation of an example air transporter.
Figure 32:
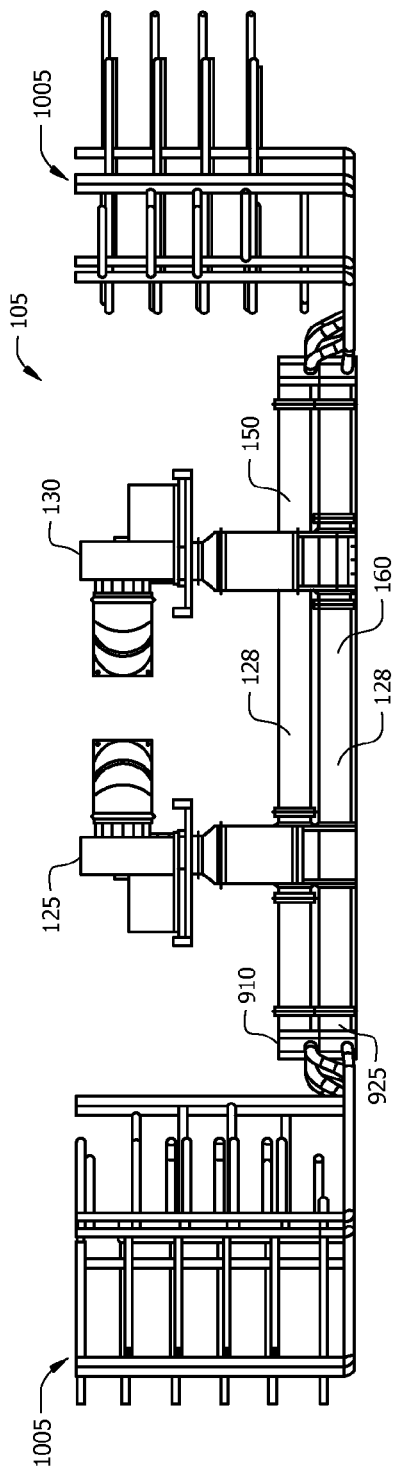
FIG. 32 illustrates a side view of an implementation of an example air transporter.
Figure 33:
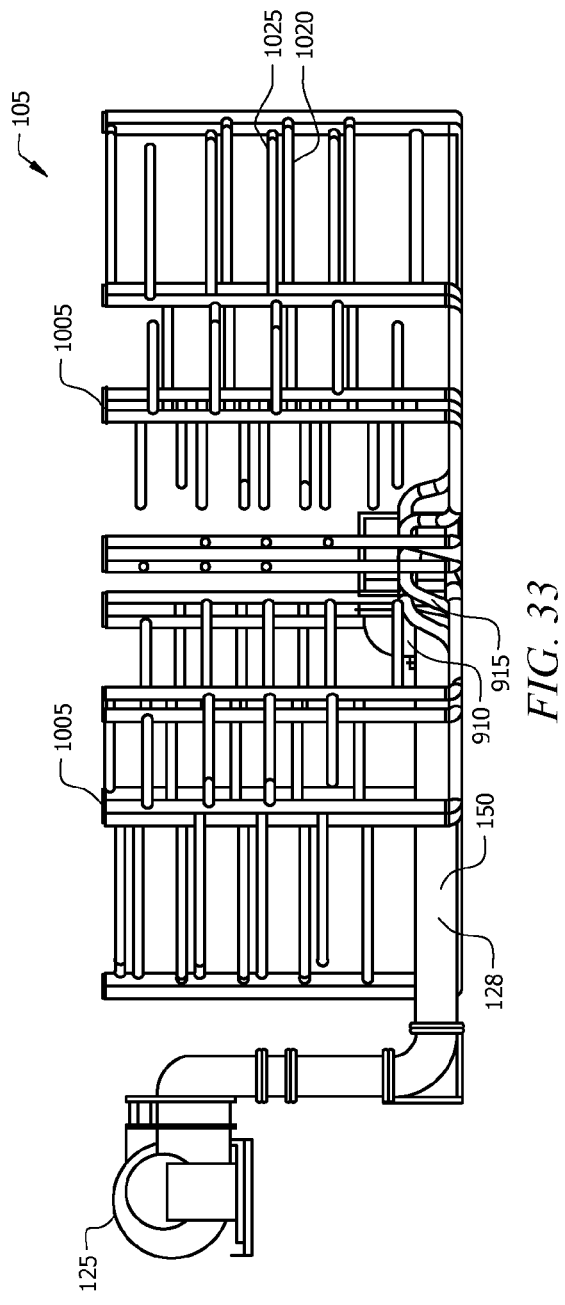
FIG. 33 illustrates a side view of an implementation of an example air transporter.
Figure 34:
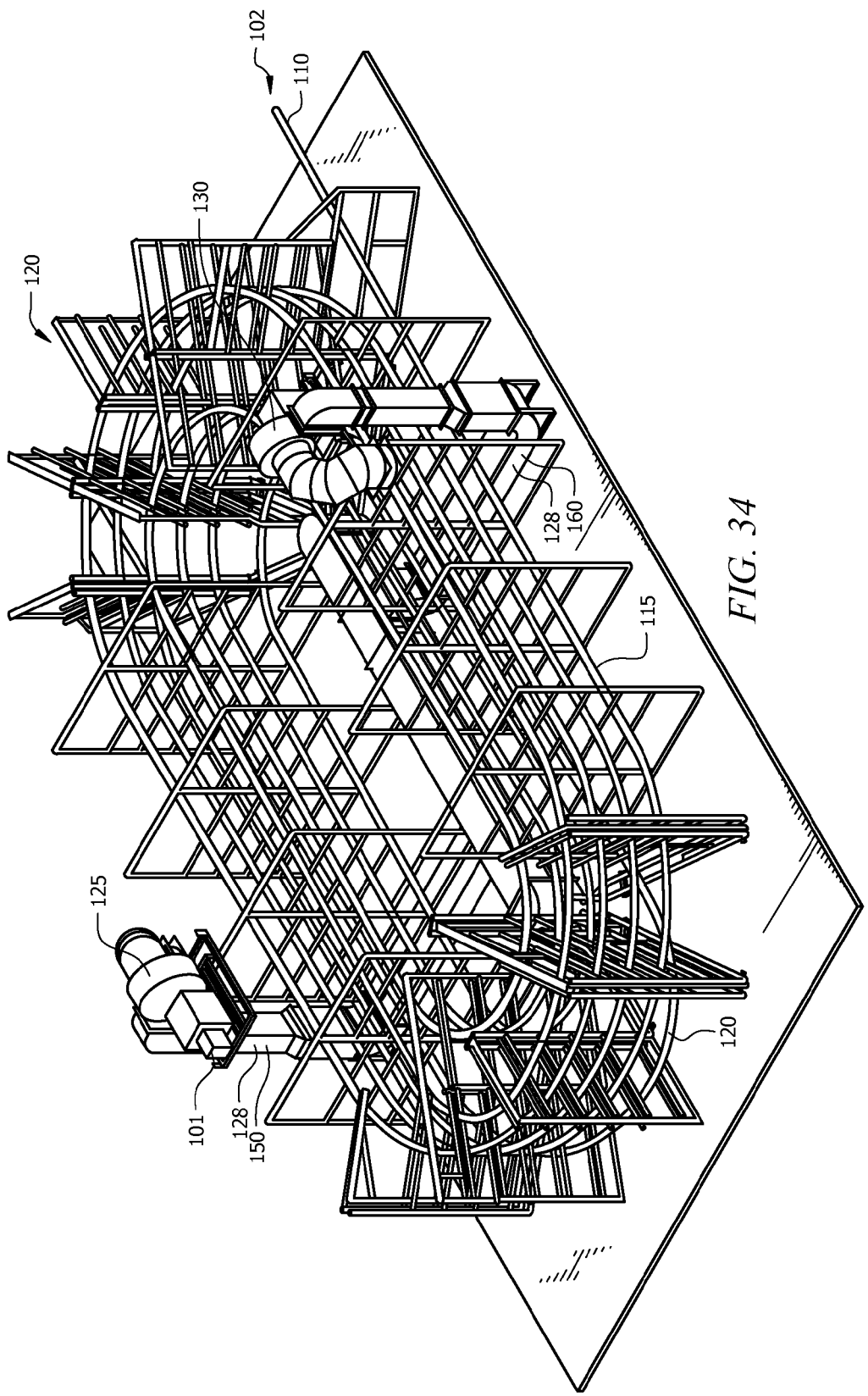
FIG. 34 illustrates a cut away view of an implementation of an example track oven.
Figure 35:
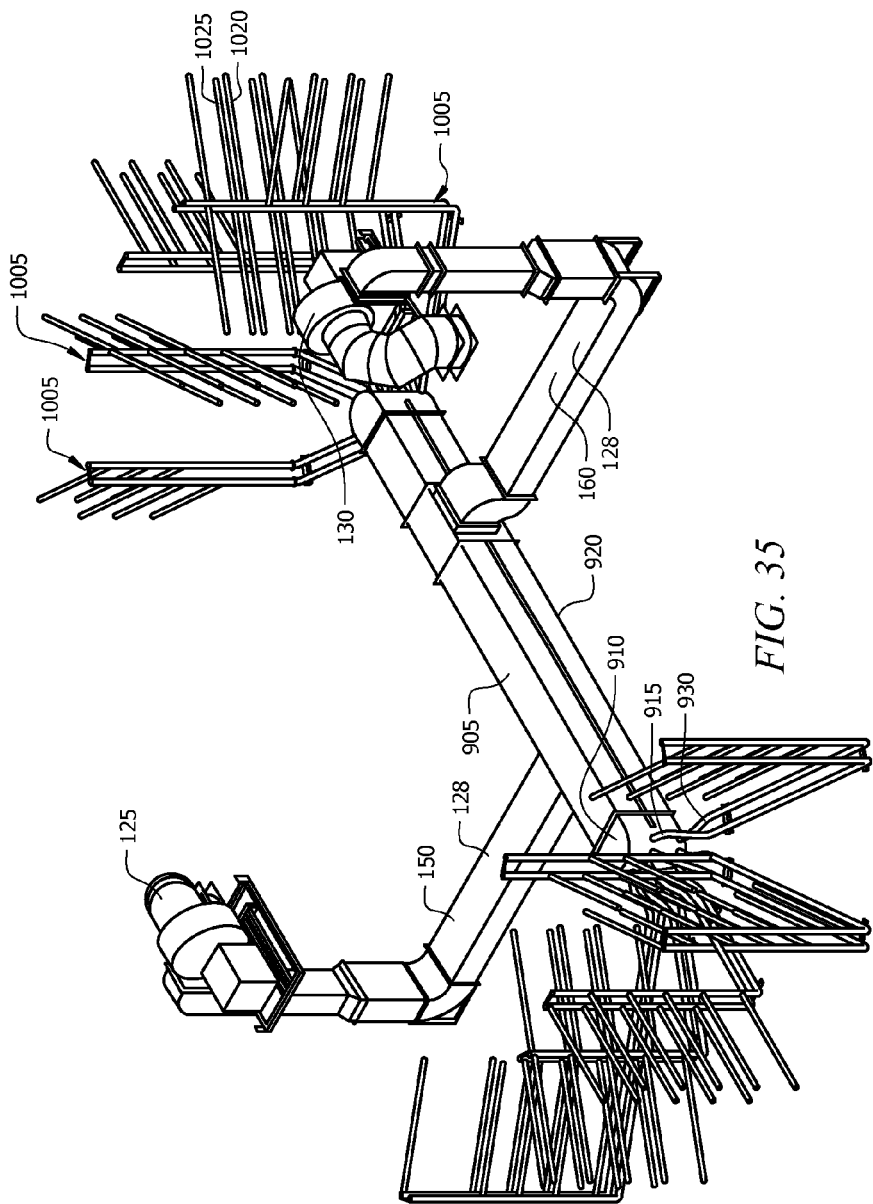
FIG. 35 illustrates an implementation of an example air transporter.
Figure 36:
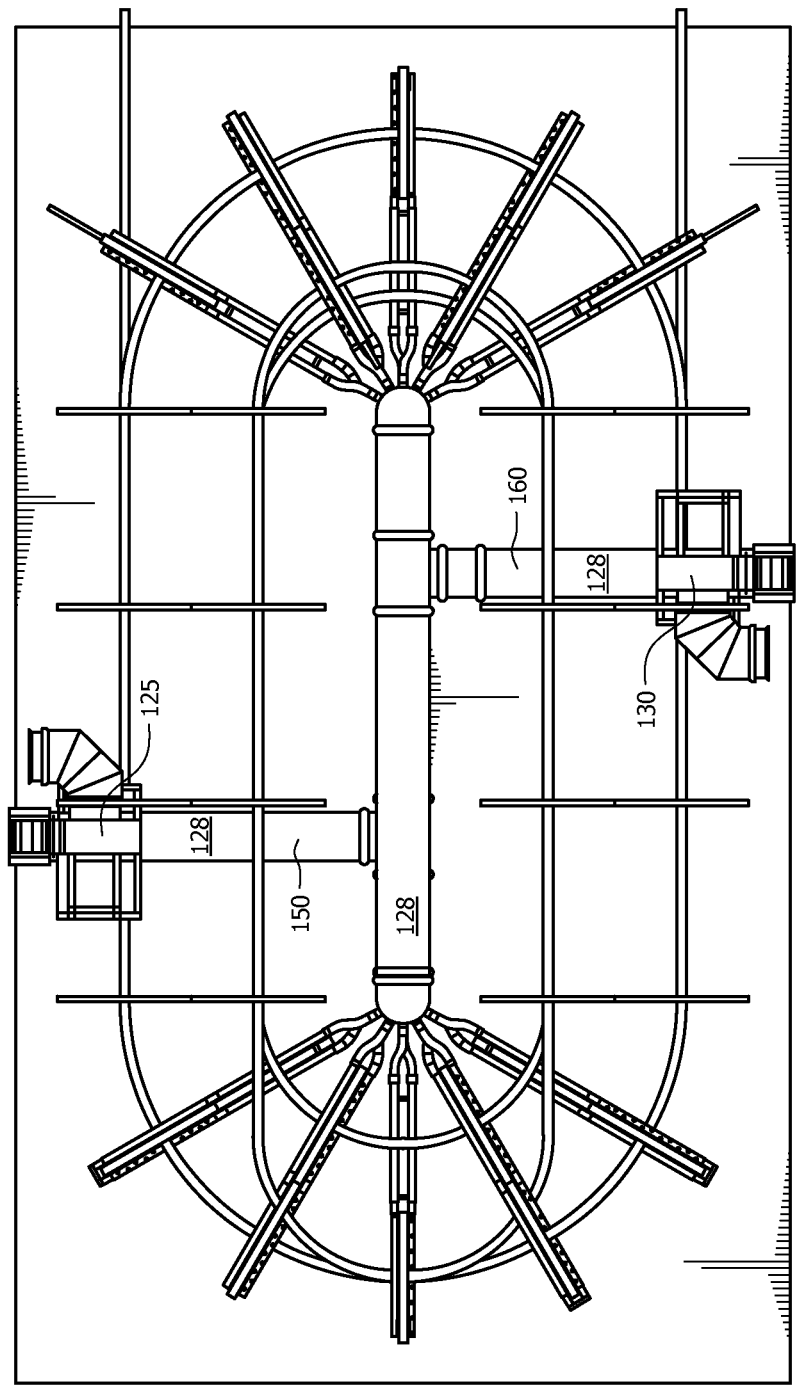
FIG. 36 illustrates a top view of a cut away of an implementation of an example track oven.
Figure 37:
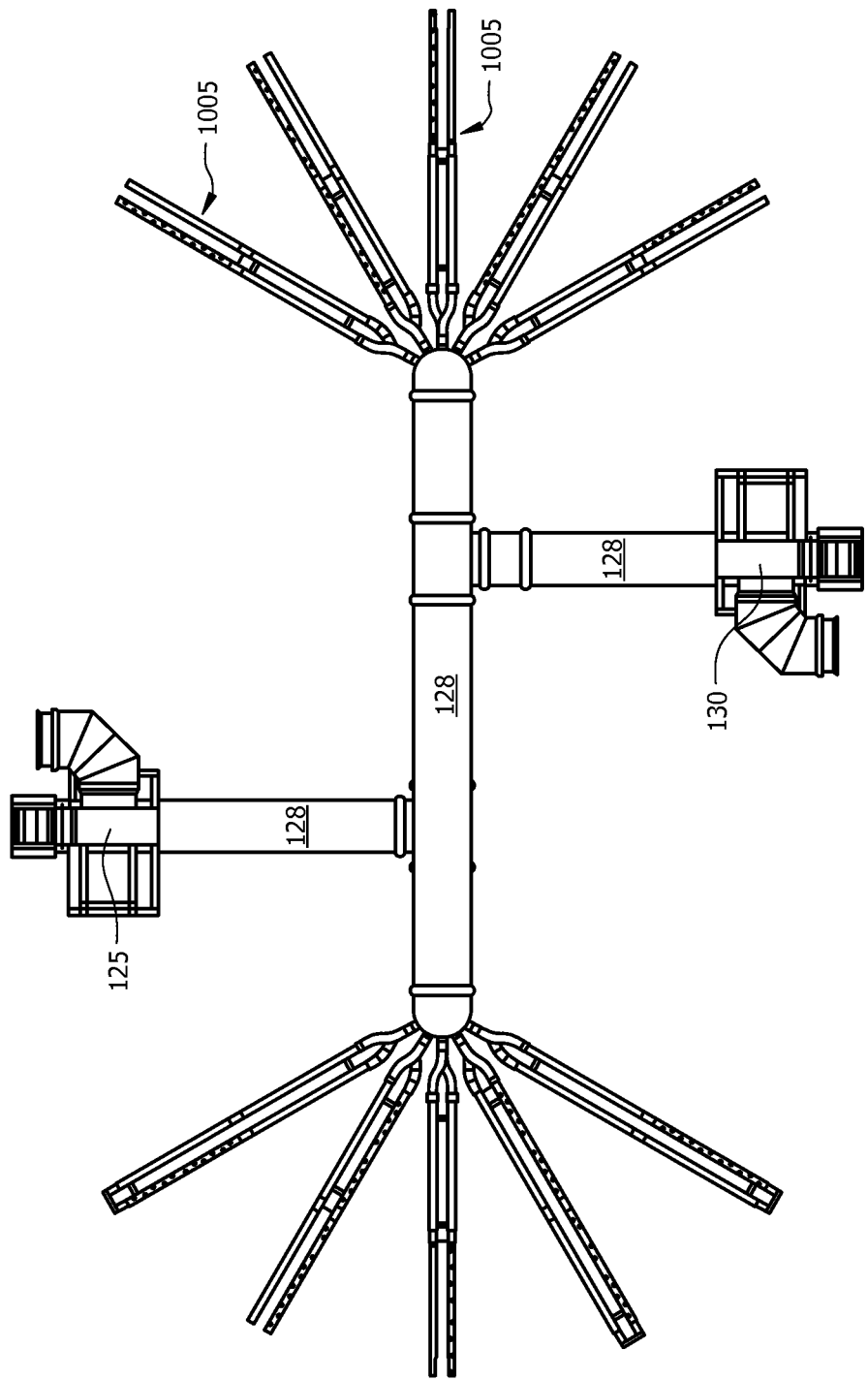
FIG. 37 illustrates a top view of an implementation of an example air transporter.
Figure 38:
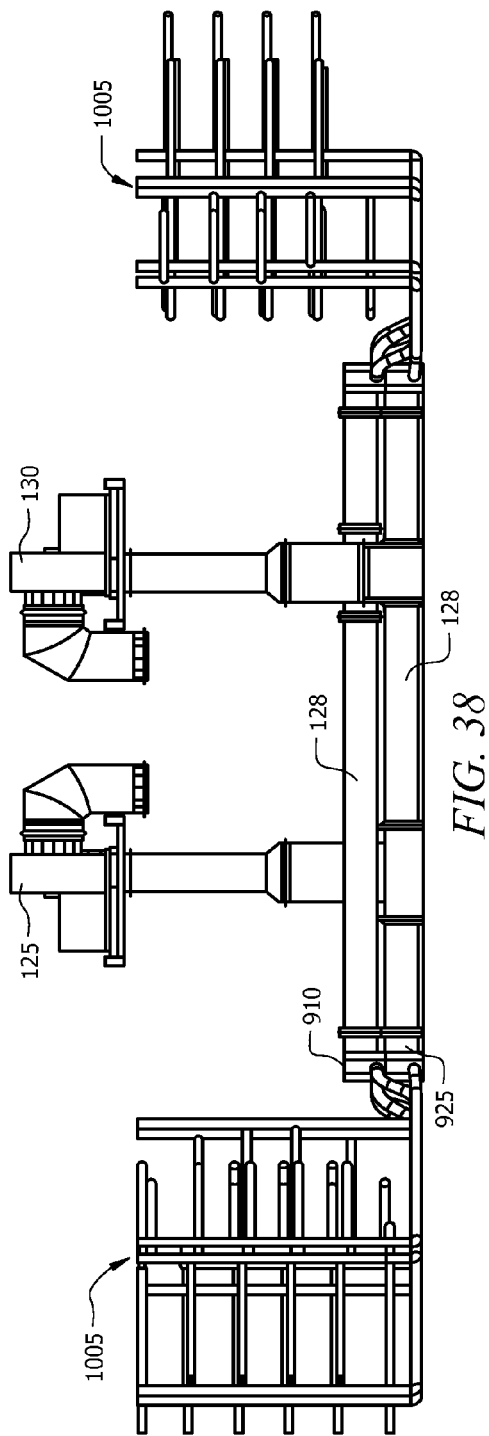
FIG. 38 illustrates a side view of an implementation of an example air transporter.
Figure 39:
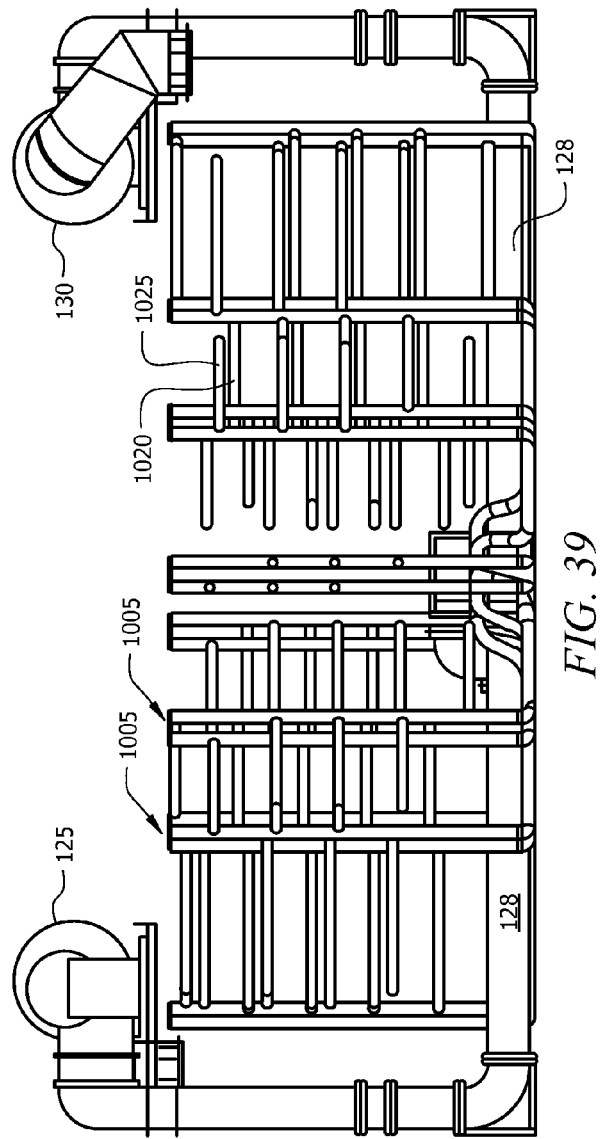
FIG. 39 illustrates a side view of an implementation of an example air transporter.

FIG. 27 illustrates an implementation of an example process 2700 for operation of the oven. During use, bakery products may be provided in containers to the oven (operation 2700). For example, the oven may include a spiral track that receives the containers and/or on which the containers are disposed. The spiral track may transport the bakery product and/or container through the oven to cook and/or partially cook the bakery product.

Heaters may be allowed to operate (operation 2705). The heat from the heaters may be allowed to heat bakery products, containers, and/or air disposed in the oven.

An upper fan may be allowed to operate (operation 2710). The upper fan may draw air heated by the heaters and/or proximate the heaters into the fan.

The upper fan may deliver the heated air to a surface of the bakery product and/or container (operation 2715). For example, heated air may be delivered via ducting to at least one upper branch of tubing structure (e.g., a tree structure). The heated air may be allowed to flow through opening(s) in the upper branch proximate an upper surface of a bakery product and/or container. The heated air may contact a surface of the bakery product and/or container. The heated air may at least partially cook at least the upper surface of the bakery product and/or promote cooking of the bakery product by increasing and/or maintaining the temperature of the container and/or bakery product.

Allow lower fan to operated (operation 2720). The lower fan may be mounted to an opposing wall of the oven. The lower fan may be mounted on an opposing side of a roof of an oven. The lower fan may draw air heated by a heater to deliver to other portions of the oven.

The lower fan may deliver heated air to a surface of the bakery product and/or container (operation 2725). For example, the heated air may be delivered via ducting to at least one lower branch of the tubing structure. The heated air may be allowed to flow through opening(s) in the lower branch to an area proximate an upper surface of a bakery product and/or container. The heated air may contact a surface of the bakery product and/or container. The heated air may at least partially cook at least a lower surface of the bakery product and/or promote cooking of the bakery product by increasing and/or maintaining the temperature of the container, and/or bakery product.

In some implementations, an amount of heated air by an upper and/or lower branch may be managed (operation 2730). For example, a type of bakery product may be identified. A user may input that 20 g rolls will be baked by an oven and set the oven operating parameters base on the type of bakery product identified.

A control scheme for the bakery product may be determined (operation 2735). For example, the oven may include preset programs and/or customizable programs for various types, sizes, and/or combinations of bakery products. A user may select a control scheme (e.g., temperature, time in oven, amount of heated air delivered by upper branch and/or lower in one or more portions of the oven).

The operation of the oven may be allowed based at least partially on the control scheme determined (operation 2740). For example, a residence time in the oven may be altered. In some implementations, an amount of heated air delivered by an upper and/or lower branch may be altered and/or maintained. For example, approximately 50% of the heated air from the upper fan may be delivered to a portion of the oven (e.g., proximate an upper surface of the bakery product and/or container) by the upper branch. In some implementations, approximately 25% of the heated air from the lower fan may be delivered to a portion of the oven (e.g., proximate a lower surface of the bakery product and/or container) by the lower branch. The amount of heated air delivered to various zones may be altered and/or maintained.

In some implementations, a second type of bakery product may be allowed to enter the oven (operation 2745). The type of bakery product may be identified for the second bakery product. For example, a user may input the new type of bakery product and a control scheme of the oven may be altered (operation 2750). In some implementations, altering the control scheme may include altering the amount of heated air allowed to be delivered by the upper and/or lower branch to a bakery product. For example, operation of an upper branch may be altered such that the upper branch delivers approximately 25% of the heated air from the upper fan.

Processes may be implemented by various described systems. In addition, various operations may be added, deleted, or modified. Various operation of the described processes and combined and/or modified. For example, in some implementations, the control scheme may be altered by properties of the bakery product during operation (e.g., cooking in the oven). For example, if a bread is not a desired color (e.g., lighter than a predetermined shade) on a top surface, an amount of heated air delivered proximate an upper surface of the bread may be increase (e.g., the amount of heated air delivered by an upper branch may be increased for example by increasing a fan speed, removing plugs from openings in the proximate branch, and/or adding plugs to openings in nonproximate branches to increase a flow to the proximate branch). If a roll is not a desired color (e.g., darker than a predetermined shade) on a top surface, an amount of heat delivered proximate an upper surface of the roll may be decreased (e.g., the amount of heat air delivered by the upper branch may be reduced for example by plugging openings in the branch proximate). In some implementations, if a bottom of a bakery product is not a desired color or doneness (e.g., compared to a predetermined color and/or doneness), the amount of heat air delivered by the lower branch may be altered to obtain a predetermined desired degree of doneness and/or coloring.

In some implementations, a control scheme may be altered based on other type(s) of bakery products at least partially disposed and/or previously disposed in the oven. For example, a temperature and/or residence times for cooking bakery products may vary. The temperature of the oven may be set for the first bakery product that enters the oven. When additional bakery products are introduced into the oven, the control scheme may be altered based on the type of additional bakery product and/or the first bakery product. For example, an amount of heated air delivered (e.g., via upper and/or lower branches) to the first bakery product and/or additional bakery product may be altered.

In some implementations, the amount of heat provided by the air transporter may be controlled. Properties of heated air (e.g., amount, temperature, speed, etc.) provided to an upper and/or lower surface of a bakery product and/or container may be alterable. For example, the amount of heated air provided to an upper surface may be greater than, less than, and/or approximately the same as the amount of heated air provided to a lower surface of a bakery product and/or container. The speed of the heated air provided to a surface may be altered, for example, a number of openings in a ducting may be selected to provide a predetermined speed. The openings may include nozzles.

By providing heated air to upper surface of a bakery product, color of an upper surface of a bakery product may be controlled. In some implementations, providing heated air to upper and lower surfaces of a bakery product and/or container may decrease bake times and/or allow baking of different bakery products continuously (e.g., since the heat provided to an upper and/or lower surface of the bakery product may be controlled).

In some implementations, the air transporter 105 may be at least partially enclosed in the oven. The air transporter 105 may be fully disposed in the oven.

In some implementations, cooking bakery products in an oven with a spiral track and air transporter that allows control of amounts of heated air delivered by upper and lower branches may reduce costs (e.g., since air heated by the heaters is reused by the air transporter) and/or may increase quality of bakery products (e.g., since the temperature above and below a bakery product on a segment of a track may be controllable). In some implementations, cooking bakery products on a spiral track with a air transporter may reduce space required for operations, reduce costs, and/or increase efficiencies (e.g., when compared with tunnel ovens).

In various implementations, portions of an oven have been described. The portions of an oven may have various dimensions and/or properties. For example, a portion of an oven may include a segment of track. A portion of an oven may include a floor to ceiling part of the oven. Portions of the oven may overlap and or not overlap.

Although various implementations have described control in an upper and/or a lower branch, various upper and/or lower branches in an air transporter may be individually and/or collectively controlled. Thus, as a bakery product travels through the oven on the track, the bakery product may be exposed to different and/or similar conditions at different times.

Although a air transporter has been described and illustrated that includes upper and lower fans mounted on opposing walls of an oven, various fan configurations may be utilized with the described systems and/or processes. For example, upper and lower fans may be disposed on a same wall, as illustrated in FIGS. 28-33. In some implementations, the upper fan and/or fan assembly and the lower fan and/or fan assembly may be disposed on a roof of an oven and/or mounted to a roof of an oven, as illustrated in FIGS. 34-39. The fans and/or fan assemblies may be disposed on and/or mounted to a roof in compliance with government and/or industry regulations, such as explosion, fire, and safety regulations.

In various implementations, an oven may be a track oven. The track oven may include a track, burner(s), and/or an air transporter. The track oven may include various portions, such as a first portion that includes at least one burner 101 and a second portion that does not include a burner. The track may be a spiral track (e.g., a single spiral track a double spiral track, etc.). The track may include one or more segments. A segment of track may be disposed proximate other segments of tracks (e.g., above, below, or adjacent to) in a portion of the oven.

The air transporter may include one or more fans and ducting. The fan(s) may be coupled in the same portion (e.g., roof, wall, floor) and/or different portion of the oven. The fans may be coupled proximate similar segments of the track (e.g., straight segments of track). The fan(s) may generate an air flow (e.g., by drawing fan into a ducting). The ducting may be coupled to the fans and provide an air flow from a first portion of the oven to a second portion of the oven. In some implementations, the ducting may draw air (e.g., via a fan) from a first portion of the oven that includes burner(s) 101 and delivers the drawn air to a second portion of the oven that does not include a burner. For example, at least one fan and at least one burner 101 is disposed proximate a straight segment(s) of a track, and the ducting may include openings that transport the air to curved segment(s) of the track. The curved segments of the tracks may not include and/or may not be proximate a burner. Thus, the air warmed by the burner may be delivered to cooler portions of the oven, such as portions that do not include a burner.

The ducting of the air transporter may have a top line 150 and a bottom line 160. In some implementations, the top line 150 may deliver air to a top surface of a container, bakery product and/or track. The bottom line 160, in some implementations, may deliver air to a bottom surface of the container, bakery product, and/or track. The top line 150 and/or bottom line 160 may include a plenum and stem(s) (e.g., coupled via a line). Each stem may include one or more branches coupled at a first end to the stem. The branches may extend outwards (e.g., a length of the branch) from the first end. The branches may include openings disposed (e g, uniformly and/or not uniformly) across at least a portion of a length of a branch. The openings may be disposed on a branch in an arrangement. For example, the arrangement may direct air towards a top surface and/or a bottom surface of a container and/or bakery product. In some implementations, the arrangement may include a specified number of openings at a specified spacing (e.g., discrete spacings that may vary across the length of the branch).

The branches coupled to a stem may be arranged such that at least a portion are proximate a top surface and/or a bottom surface of a track, container, and/or bakery product. In some implementations, the branches may be coupled in pairs about a segment of track such that at least a portion of the openings in a first branch may be directed to a top surface of a container and at least a portion of the openings in a second branch may be directed to a bottom surface of the container. The branches may not be coupled in pairs about a segment of track in some implementations.

During operation of the oven, air may be allowed to flow from first openings disposed along a length of a first branch of a ducting proximate a top surface of a segment of a track. Air may be allowed to flow from second openings disposed along a length of a second branch of the ducting of an oven to an area proximate a bottom surface of a segment of a track. In some implementations, the amount of air delivered from the first branch may be similar or different from the amount of air delivered from the second branch. For example, the first branch may include more or less openings than the second branch. In some implementations, stop(s) 1002 may be utilized to alter the amount of air delivered from the openings of the first branch and/or the second branch. The stop(s) 1002 may restrict the flow of air through an opening, in some implementations.

In some implementations, during use, burners 101 may be disposed in a first portion of the oven and a second portion of the oven may not include burners. The burners 101 may elevate the temperature of at least a portion of the air in the first portion of the oven. The fan may generate an air flow and cause at least a portion of the elevated temperature air to be delivered to the second portion of the oven via the ducting.

In some implementations, the oven that includes the track (e.g., spiral track, such as a double spiral track), burners, and air transporter may operate at a variety of control settings. The properties of the oven and/or bakery product may be monitored (e.g., via sensors and/or a controller) and the control setting may be altered. For example, an oven may be allowed to operate at a first setting (e.g., operation of a first fan and a second fan; operation of a first fan; operation of one or more burners, and/or other appropriate operations). The browning of a bakery product may be determined by a sensor and if the bakery product is overbrown the control setting may be altered to a second control setting (e.g., turn off a burner, increase a fan speed, restrict flow through one or more openings in a later segment of the track, and/or other appropriate operations). In some implementations, a temperature profile of an oven may be determined (e.g., using sensors of the oven) and compared to a predetermined temperature profile (e.g., retrieved from a memory of the oven, provided by a user, and/or retrieved from a website). The control setting of the oven may be altered based on the comparison. For example, if a temperature profile is not approximately similar to the predetermined temperature profile, the control setting may be altered (e.g., burner and/or fan and/or branch openings setting may be altered). If the temperature profile is within a predetermined tolerance value of the predetermined temperature profile, alteration of the control setting may be restricted.

In various implementations, the described oven and processes may be utilized to bake bakery products.

Although various components of the oven have been specifically described, any appropriate type(s) and/or combination of component(s) may be utilized. For example, any appropriate fan that creates fluid flow may be utilized (e.g., recirculating, axial flow, and/or centrifugal). Fans may be mounted to floors, roofs, and/or walls, for example. The heater may be any appropriate heat emitting system, such as a natural gas heater, an electric heater, and/or other heating element. The ducting may include an appropriate channel for conveying fluid (e.g., air). For example, the ducting may include a housing with a rectangular, circular, and/or other appropriate cross-sectional shape. The housing may include tubing and/or other conduit.

In some implementations, track may include a support structure. Portions of the support structure may be disposed between upper and/or lower branches of the ducting. The support structure may include a recessed portion to receive a chain drive. The support structure may support a weight of containers and/or bakery products. The support structure may be fixed and allow the chain drive to guide bakery products and/or containers through the oven.

Although a container such as a pan has been described, in various implementations, any appropriate container may be utilized. For example, a baking pan and/or tray may be used. The container may include metal, ceramic, and/or silicone, in some implementations. The container may include various housings, such as an at least partially open top surface, such as a pan without a lid and/or be an enclosed housing, such as a Pullman loaf pan.

Various described patents have been incorporated by reference. The described patents are incorporated by reference to the extent that no conflict exists between the various described systems and/or processes and the described patents. Any portion, of the described patents that are incorporated by reference, that is conflicting with the various described systems and/or processes are not incorporated by reference.

Although users have been described as a human, a user may be a person, a group of people, a person or persons interacting with one or more computers, and/or a computer system. Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to a storage system (e.g., repository), at least one input device, and at least one output device.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a duct" includes a combination of two or more ducts and reference to "a bakery product" includes different types and/or combinations of bakery products. As another example, "coupling" includes direct and/or indirect coupling of members. For example, a fan may be directly coupled to a wall. A fan may be coupled to a wall through a structure, in some implementations.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An oven comprising: a spiral track adapted to transport containers through the oven; one or more burners to provide heat; an air transporter comprising:
    a plurality of fans adapted to generate an air flow;
    an intake coupled to at least one fan of the plurality of fans, wherein the intake is disposed proximate an upper portion of the oven and proximate at least one heater;
    an intake duct coupled to the intake and provided to draw heated air from the intake to the at least one fan of the plurality of fans, wherein the at least one fan of the plurality of fans expels heated air through a ducting to portions of the oven; and
    the ducting coupled to the plurality of fans, wherein the ducting comprises:
    a top line comprising a plurality of first openings, wherein the top line is configured such that at least a portion of the air flow from at least one of the plurality of fans travels through the ducting and is directed through one or more of the first openings in the top line to an area proximate a top of the track; and
    a bottom line comprising a plurality of second openings, wherein the bottom line is configured such that at least a portion of the air flow from at least one of the plurality of fans travels through the ducting and is directed through one or more of the second openings in the bottom line to an area proximate a bottom of the track;
    at least one plenum extending from the top line and disposed to provide tubing, wherein the tubing is connected to the plenum on one end of the tubing and connected to a stem on an opposite end of the tubing; and
    a plurality of branches extending from the stem and disposed to deliver air to both proximate a top surface of the spiral track and proximate a bottom surface of the spiral track, wherein a bottom surface of each container is supported by the top surface of the spiral track; and
    wherein the spiral track comprises a plurality of segments, and wherein the plurality of segments include one or more straight segments coupled by one or more curved segments, wherein a straight segment of the track includes at least one linear portion, and wherein a curved segment of the track includes at least one curved portion, and wherein at least one of the burners is disposed proximate one of the straight segments of the track, and wherein the ducting is configured to direct air that is proximate one or more of the burners that is proximate at least one of the straight segments to an area of the oven that is proximate at least one curved segment of the track.

2. The oven of claim 1 wherein at least one of the plurality of fans is independently operable from at least one of the other fans selected from the plurality of fans.

3. The oven of claim 1 wherein least a portion of the first openings are disposed about a length of at least one branch of the plurality of branches.

4. The oven of claim 1 wherein the stem extends from at least one of the top line or the bottom line, and wherein the stem comprises:
    a first branch of the plurality of branches comprising a plurality of the first openings disposed along a length of the first branch in a first arrangement; and
    a second branch of the plurality of branches comprising a plurality of the first openings disposed along a length of the second branch in a second arrangement.

5. The oven of claim 4 wherein the first arrangement of openings comprises first openings approximately linearly disposed along a length of the stem.

6. The oven of claim 4 wherein the first arrangement and the second arrangement are similar or dissimilar.

7. The oven of claim 1 further comprising one or more stops disposed in at least one of:
- at least one of the first openings of the top line; or
- at least one of the second openings of the bottom line;
- wherein a stop is adapted to restrict flow through at least one of the first openings or the second openings.

8. The oven of claim 1 wherein at least two of the plurality of fans comprise a first fan coupled to a first surface of the oven and a second fan coupled to an opposing surface of the oven.

9. The oven of claim 1 wherein at least two of the plurality of fans comprise a first fan and a second fan coupled to a surface of the oven.

10. The oven of claim 1 wherein the spiral track comprises a plurality of segments; wherein the plurality of segments comprise one or more straight segments coupled by one or more curved segments, wherein a straight segment of the track includes at least one linear portion, and wherein the curved segment comprises at least one curved portion, and at least two of the plurality of fans are disposed proximate at least one of the straight segments of the track.

* * * * *